US012780665B2

(12) United States Patent
Johnson et al.

(10) Patent No.: US 12,780,665 B2
(45) **Date of Patent: *Nov. 3, 2026**

(54) CARBON-BASED NANOMATERIAL COMPOSITION AND METHODS OF FORMING THE SAME FROM A GAS MIXTURE THAT INCLUDES ACETYLENE AND METHANE GAS

(71) Applicant: NABORS ENERGY TRANSITION SOLUTIONS LLC, Houston, TX (US)

(72) Inventors: Evan Johnson, Spring, TX (US); Paul Yollin, Tomball, TX (US); Dylan Cook, Spring, TX (US)

(73) Assignee: Nabors Energy Transition Solutions LLC, Houston, TX (US)

(*) Notice: Subject to any disclaimer, the term of this patent is extended or adjusted under 35 U.S.C. 154(b) by 727 days.

This patent is subject to a terminal disclaimer.

(21) Appl. No.: 18/069,589

(22) Filed: Dec. 21, 2022

(65) Prior Publication Data

US 2023/0192495 A1 Jun. 22, 2023

Related U.S. Application Data

(60) Provisional application No. 63/379,313, filed on Oct. 13, 2022, provisional application No. 63/292,603, filed on Dec. 22, 2021.

(51) Int. Cl.
*C01B 32/184* (2017.01)
*C09C 1/54* (2006.01)

(52) U.S. Cl.
CPC .............. *C01B 32/184* (2017.08); *C09C 1/54* (2013.01)

(58) Field of Classification Search
CPC ................................ C01B 32/184; C09C 1/54
See application file for complete search history.

(56) References Cited

U.S. PATENT DOCUMENTS

| | | | | |
|---|---|---|---|---|
| 2,121,463 | A * | 6/1938 | Wisdom | C09C 1/54 422/150 |
| 5,132,105 | A | 7/1992 | Remo | |
| 6,331,209 | B1 | 12/2001 | Jang et al. | |
| 6,350,488 | B1 | 2/2002 | Lee et al. | |
| 6,514,113 | B1 | 2/2003 | Lee et al. | |
| 6,648,711 | B1 | 11/2003 | Jang et al. | |
| 6,759,025 | B2 | 7/2004 | Hong et al. | |
| 7,118,440 | B2 | 10/2006 | Kuo et al. | |
| 7,452,735 | B2 | 11/2008 | Li et al. | |
| 7,462,498 | B2 | 12/2008 | Mao et al. | |
| 7,611,906 | B2 | 11/2009 | Yaniv | |
| 7,619,257 | B2 | 11/2009 | Pfeiffer | |
| 7,781,061 | B2 | 8/2010 | Garcia et al. | |
| 8,007,588 | B2 | 8/2011 | Ito et al. | |
| 8,062,697 | B2 | 11/2011 | Yaniv et al. | |
| 8,129,463 | B2 | 3/2012 | Mao et al. | |
| 8,455,047 | B2 | 6/2013 | Li et al. | |
| 8,668,952 | B2 | 3/2014 | Hikata et al. | |
| 8,784,663 | B2 | 7/2014 | Wei et al. | |
| 8,803,636 | B2 | 8/2014 | Ermolov | |
| 8,865,268 | B2 | 10/2014 | Haque et al. | |
| 8,952,477 | B2 | 2/2015 | Yamada et al. | |
| 9,080,928 | B2 | 7/2015 | Borini et al. | |
| 9,099,252 | B2 | 8/2015 | Liu et al. | |
| 9,202,639 | B2 | 12/2015 | Wei et al. | |
| 9,290,389 | B2 | 3/2016 | Haque et al. | |

(Continued)

FOREIGN PATENT DOCUMENTS

| | | |
|---|---|---|
| AU | 2018201650 A1 | 9/2018 |
| AU | 2021361326 A1 | 5/2023 |

(Continued)

OTHER PUBLICATIONS

Teng et al., 'Fabrication and Characterization of Nanocarbon-Based Nanofluids by Using Oxygen-Acetylene Flame Synthesis System' in Nanoscale Research Letters 11:288 (2016) pp. 1-13 (Year: 2016).*
International Preliminary Report on Patentability for PCT Application No. PCT/US2023/063417, dated Sep. 19, 2024, 8 pages.
International Preliminary Report on Patentability for PCT Application No. PCT/US2023/063419, dated Sep. 19, 2024, 7 pages.
International Preliminary Report on Patentability for PCT Application No. PCT/US2023/063420, dated Sep. 19, 2024, 8 pages.
International Preliminary Report on Patentability for PCT Application No. PCT/US2023/063422, dated Sep. 19, 2024, 8 pages.
International Preliminary Report on Patentability for PCT Application No. PCT/US2023/063423, dated Sep. 19, 2024, 8 pages.
International Preliminary Report on Patentability for PCT Application No. PCT/US2023/063424, dated Sep. 19, 2024, 8 pages.
Cao, M.J. et al., "Research progress on graphene production by methane cracking: approach and growth mechanism", Materials Today Sustainability, vol. 24, Dec. 2023.
International Preliminary Report on Patentability for PCT Application No. PCT/US2023/022885, dated Dec. 5, 2024, 8 pages.
International Preliminary Report on Patentability for PCT Application No. PCT/US2023/022892, dated Dec. 5, 2024, 8 pages.

(Continued)

*Primary Examiner* — Stuart L Hendrickson
(74) *Attorney, Agent, or Firm* — Merchant & Gould P.C.

(57) ABSTRACT

The present disclosure relates to a carbon-based nanomaterial composition that may be formed from a gas mixture. The gas mixture may include acetylene gas at a molar ratio $AG_{mol}/GM_{mol}$ of at least about 0.25 and not greater than about 0.99, oxygen gas at a molar ratio $OG_{mol}/GM_{mol}$ of at least about 0.01 and not greater than about 0.55, hydrogen gas at a molar ratio $HG_{mol}/GM_{mol}$ of at least about 0.05 and not greater than about 0.75, and methane gas at a molar ratio $MG_{mol}/GM_{mol}$ of at least about 0.25 and not greater than about 0.99. The carbon-based nanomaterial composition may have a carbon hybridization ratio $P_{sp3}/P_{sp2}$ of at least about 0.0 and not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

22 Claims, 4 Drawing Sheets

(56) References Cited

U.S. PATENT DOCUMENTS

| | | | |
|---|---|---|---|
| 9,362,565 | B2 | 6/2016 | Wei et al. |
| 9,380,979 | B2 | 7/2016 | White et al. |
| 9,406,985 | B2 | 8/2016 | Amaratunga et al. |
| 9,413,032 | B2 | 8/2016 | Wei et al. |
| 9,440,857 | B2 | 9/2016 | Sorensen et al. |
| 9,440,858 | B2 | 9/2016 | Lipka et al. |
| 9,446,965 | B2 | 9/2016 | Kverel et al. |
| 9,490,658 | B2 | 11/2016 | Wei et al. |
| 9,496,435 | B2 | 11/2016 | Wang et al. |
| 9,601,763 | B2 | 3/2017 | Fang et al. |
| 9,660,003 | B2 | 5/2017 | Sato et al. |
| 9,670,066 | B2 | 6/2017 | Lipka et al. |
| 9,676,621 | B2 | 6/2017 | Chen et al. |
| 9,761,380 | B2 | 9/2017 | Wei et al. |
| 9,765,271 | B2 | 9/2017 | Myrick |
| 9,767,992 | B1 | 9/2017 | Stowell et al. |
| 9,782,739 | B2 | 10/2017 | Laine |
| 9,786,444 | B2 | 10/2017 | Hiralal et al. |
| 9,824,789 | B2 | 11/2017 | Pei et al. |
| 9,859,515 | B2 | 1/2018 | Hammond et al. |
| 9,862,602 | B1 | 1/2018 | Riso et al. |
| 9,862,606 | B1 | 1/2018 | Cook et al. |
| 9,887,352 | B2 | 2/2018 | Bessonov et al. |
| 9,905,373 | B2 | 2/2018 | Zhamu et al. |
| 9,917,299 | B2 | 3/2018 | Behan et al. |
| 9,923,206 | B2 | 3/2018 | Chen et al. |
| 9,925,559 | B2 | 3/2018 | Lee et al. |
| 9,945,765 | B2 | 4/2018 | White et al. |
| 9,978,940 | B2 | 5/2018 | Bessonov et al. |
| 9,997,334 | B1 | 6/2018 | Anzelmo et al. |
| 9,997,784 | B2 | 6/2018 | Su et al. |
| 10,069,139 | B2 | 9/2018 | Wang et al. |
| 10,294,133 | B2 | 5/2019 | Hashim et al. |
| 10,316,215 | B2 | 6/2019 | Castaño Meneses |
| 10,326,135 | B2 | 6/2019 | Fasching et al. |
| 10,364,401 | B2 | 7/2019 | Soto-Castillo et al. |
| 10,401,701 | B2 | 9/2019 | Coklin et al. |
| 10,416,519 | B2 | 9/2019 | Conklin et al. |
| 10,428,197 | B2 | 10/2019 | Anzelmo et al. |
| 10,465,128 | B2 | 11/2019 | Cruz et al. |
| 10,472,497 | B2 | 11/2019 | Stowell et al. |
| 10,502,705 | B2 | 12/2019 | Stowell et al. |
| 10,611,979 | B2 | 4/2020 | Diloyan et al. |
| 10,637,043 | B2 | 4/2020 | Zhamu et al. |
| 10,665,724 | B2 | 5/2020 | Pohjonen et al. |
| 10,690,047 | B1 | 6/2020 | LaStella |
| 10,734,653 | B2 | 8/2020 | Lanning et al. |
| 10,756,334 | B2 | 8/2020 | Stowell et al. |
| 10,781,103 | B2 | 9/2020 | Tanner et al. |
| 10,819,313 | B2 | 10/2020 | Voutilainen |
| 10,822,542 | B2 | 11/2020 | Zhong et al. |
| 10,847,704 | B2 | 11/2020 | Sugiura et al. |
| 10,858,755 | B2 | 12/2020 | Kula et al. |
| 10,920,035 | B2 | 2/2021 | Rogojina et al. |
| 10,943,076 | B2 | 3/2021 | Stowell et al. |
| 10,982,119 | B2 | 4/2021 | El-Kady et al. |
| 11,045,427 | B2 | 6/2021 | John et al. |
| 11,107,662 | B2 | 8/2021 | Stowell et al. |
| 11,120,977 | B2 | 9/2021 | Fabien et al. |
| 11,127,941 | B2 | 9/2021 | Lanning et al. |
| 11,127,942 | B2 | 9/2021 | Gazda et al. |
| 11,133,495 | B2 | 9/2021 | Gazda et al. |
| 11,137,368 | B2 | 10/2021 | Stowell et al. |
| 11,198,611 | B2 | 12/2021 | Lanning et al. |
| 11,222,756 | B2 | 1/2022 | Tang et al. |
| 11,224,859 | B2 | 1/2022 | Rong et al. |
| 11,309,545 | B2 | 4/2022 | Kumar et al. |
| 11,335,911 | B2 | 5/2022 | Lanning et al. |
| 11,342,561 | B2 | 5/2022 | Rogojina et al. |
| 11,352,481 | B2 | 6/2022 | Stowell et al. |
| 11,367,895 | B1 | 6/2022 | Shan et al. |
| 11,398,622 | B2 | 7/2022 | Gazda et al. |
| 11,404,692 | B1 | 8/2022 | Lanning et al. |
| 11,433,369 | B1 | 9/2022 | Nicole et al. |
| 11,446,966 | B2 | 9/2022 | Stowell et al. |
| 11,479,062 | B2 | 10/2022 | Stowell et al. |
| 11,489,161 | B2 | 11/2022 | Kumar et al. |
| 11,508,966 | B2 | 11/2022 | Bell et al. |
| 11,511,997 | B2 | 11/2022 | Lim et al. |
| 11,539,074 | B2 | 12/2022 | Rogojina et al. |
| 11,553,630 | B2 | 1/2023 | Kaner et al. |
| 11,555,748 | B2 | 1/2023 | Stowell et al. |
| 11,555,761 | B1 | 1/2023 | Stowell |
| 11,555,799 | B2 | 1/2023 | Lanning et al. |
| 11,585,731 | B2 | 2/2023 | Stowell et al. |
| 11,591,457 | B1 | 2/2023 | Khan et al. |
| 11,592,279 | B2 | 2/2023 | Stowell et al. |
| 11,600,876 | B2 | 3/2023 | Gazda |
| 11,613,817 | B2 | 3/2023 | Stowell et al. |
| 11,623,197 | B2 | 4/2023 | Stowell et al. |
| 11,631,893 | B2 | 4/2023 | Rogojina et al. |
| 11,656,070 | B2 | 5/2023 | Stowell et al. |
| 11,670,826 | B2 | 6/2023 | Gazda |
| 11,674,031 | B1 | 6/2023 | Anzelmo et al. |
| 11,680,012 | B2 | 6/2023 | Stowell et al. |
| 11,688,895 | B1 | 6/2023 | Gibbs et al. |
| 11,719,582 | B2 | 8/2023 | Stowell et al. |
| 11,735,745 | B2 | 8/2023 | Vanheusden et al. |
| 11,739,409 | B2 | 8/2023 | Stowell et al. |
| 11,761,057 | B1 | 9/2023 | Stowell et al. |
| 11,796,883 | B2 | 10/2023 | Conklin et al. |
| 11,814,292 | B2 | 11/2023 | El-Kady et al. |
| 11,897,768 | B2 | 2/2024 | Ashton et al. |
| 12,371,326 | B2 | 7/2025 | Johnson et al. |
| 2006/0062715 | A1 | 3/2006 | Endo et al. |
| 2006/0078730 | A1 | 4/2006 | Tsukada et al. |
| 2006/0093545 | A1 | 5/2006 | Maruyama et al. |
| 2006/0196763 | A1 | 9/2006 | Choi et al. |
| 2006/0216517 | A1 | 9/2006 | Handa et al. |
| 2006/0217025 | A1 | 9/2006 | Hsiao et al. |
| 2006/0263588 | A1 | 11/2006 | Handa et al. |
| 2008/0241047 | A1 | 10/2008 | Asano |
| 2008/0254296 | A1 | 10/2008 | Handa et al. |
| 2009/0035570 | A1 | 2/2009 | Mao et al. |
| 2009/0047428 | A1 | 2/2009 | Shan et al. |
| 2009/0121606 | A1 | 5/2009 | Okubo et al. |
| 2009/0124746 | A1 | 5/2009 | Handa et al. |
| 2009/0131575 | A1 | 5/2009 | Handa et al. |
| 2009/0135042 | A1 | 5/2009 | Umishita et al. |
| 2009/0152508 | A1 | 6/2009 | Handa et al. |
| 2009/0162636 | A1 | 6/2009 | Shan et al. |
| 2009/0226712 | A1 | 9/2009 | Handa et al. |
| 2009/0247796 | A1 | 10/2009 | Waycuilis et al. |
| 2009/0261186 | A1 | 10/2009 | Fink et al. |
| 2009/0263642 | A1 | 10/2009 | Handa et al. |
| 2009/0292057 | A1 | 11/2009 | Handa et al. |
| 2010/0149018 | A1 | 6/2010 | Umishita et al. |
| 2010/0181534 | A1 | 7/2010 | Shenderova et al. |
| 2010/0310447 | A1 | 12/2010 | Yaniv et al. |
| 2011/0027603 | A1 | 2/2011 | Yaniv et al. |
| 2011/0045273 | A1 | 2/2011 | Handa et al. |
| 2011/0147647 | A1 | 6/2011 | Yaniv et al. |
| 2011/0175065 | A1 | 7/2011 | de la Vega et al. |
| 2012/0082787 | A1 | 4/2012 | Fujita |
| 2012/0315482 | A1 | 12/2012 | Muramatsu et al. |
| 2013/0316092 | A1 | 11/2013 | Chen et al. |
| 2014/0216942 | A1 | 8/2014 | Jiang et al. |
| 2014/0235513 | A1 | 8/2014 | Kverel et al. |
| 2014/0335010 | A1 | 11/2014 | Sorensen et al. |
| 2015/0004667 | A1 | 1/2015 | McKinney et al. |
| 2015/0017699 | A1 | 1/2015 | McKinney et al. |
| 2015/0047687 | A1 | 2/2015 | Conklin et al. |
| 2015/0047697 | A1 | 2/2015 | Conklin et al. |
| 2015/0047882 | A1 | 2/2015 | Jiang et al. |
| 2015/0060817 | A1 | 3/2015 | Sato et al. |
| 2015/0155127 | A1 | 6/2015 | Fink et al. |
| 2016/0130149 | A1 | 5/2016 | Shankman |
| 2016/0225991 | A1 | 8/2016 | Schwab et al. |
| 2016/0240861 | A1 | 8/2016 | Kurungot et al. |
| 2016/0329586 | A1 | 11/2016 | Ninan et al. |
| 2017/0179314 | A1 | 6/2017 | Novoselov et al. |
| 2017/0278643 | A1 | 9/2017 | El-Kady et al. |
| 2018/0207591 | A1 | 7/2018 | Yu et al. |
| 2018/0248175 | A1 | 8/2018 | Ghezelbash et al. |

(56) References Cited

U.S. PATENT DOCUMENTS

| | | | |
|---|---|---|---|
| 2018/0261847 | A1 | 9/2018 | Su et al. |
| 2018/0265359 | A1 | 9/2018 | Cross |
| 2018/0305570 | A1 | 10/2018 | El-Kady et al. |
| 2018/0320586 | A1 | 11/2018 | Johnson et al. |
| 2018/0346337 | A1 | 12/2018 | Tour et al. |
| 2018/0366280 | A1 | 12/2018 | Hwang et al. |
| 2018/0370801 | A1 | 12/2018 | Patole |
| 2019/0031906 | A1 | 1/2019 | Kim et al. |
| 2019/0039907 | A1 | 2/2019 | Zeng et al. |
| 2019/0048161 | A1 | 2/2019 | Zeng et al. |
| 2019/0088420 | A1 | 3/2019 | Tour et al. |
| 2019/0100658 | A1* | 4/2019 | Taylor ........................ C09C 1/54 |
| 2019/0109317 | A1 | 4/2019 | Zhou et al. |
| 2019/0161352 | A1 | 5/2019 | Price |
| 2020/0040444 | A1 | 2/2020 | Stowell et al. |
| 2020/0066474 | A1 | 2/2020 | Lorr et al. |
| 2020/0112026 | A1 | 4/2020 | Tour et al. |
| 2020/0173045 | A1 | 6/2020 | Chen et al. |
| 2020/0243846 | A1 | 7/2020 | He et al. |
| 2020/0246179 | A1 | 8/2020 | Peyman |
| 2020/0274181 | A1 | 8/2020 | Park et al. |
| 2020/0294779 | A1 | 9/2020 | Ashton et al. |
| 2020/0294780 | A1 | 9/2020 | Ashton et al. |
| 2020/0298174 | A1 | 9/2020 | Boudreault |
| 2020/0302328 | A1 | 9/2020 | Nafradi et al. |
| 2020/0369526 | A1 | 11/2020 | Ladislaus et al. |
| 2020/0402768 | A1 | 12/2020 | Stowell et al. |
| 2021/0017031 | A1 | 1/2021 | Hardman et al. |
| 2021/0053829 | A1 | 2/2021 | Tanner et al. |
| 2021/0114886 | A1 | 4/2021 | Rohani et al. |
| 2021/0172904 | A1 | 6/2021 | Stowell et al. |
| 2021/0172905 | A1 | 6/2021 | Stowell et al. |
| 2021/0181145 | A1 | 6/2021 | Stowell et al. |
| 2021/0181146 | A1 | 6/2021 | Stowell et al. |
| 2021/0210753 | A1 | 7/2021 | Gazda et al. |
| 2021/0218110 | A1 | 7/2021 | Lanning et al. |
| 2021/0226225 | A1 | 7/2021 | Lanning et al. |
| 2021/0226302 | A1 | 7/2021 | Lanning et al. |
| 2021/0238040 | A1 | 8/2021 | Opoku et al. |
| 2021/0242505 | A1 | 8/2021 | Gazda et al. |
| 2021/0257666 | A1 | 8/2021 | Huang et al. |
| 2021/0257667 | A1 | 8/2021 | Gazda et al. |
| 2021/0359306 | A1 | 11/2021 | Rogojina et al. |
| 2021/0359308 | A1 | 11/2021 | Huang et al. |
| 2021/0396708 | A1 | 12/2021 | Lim et al. |
| 2021/0396709 | A1 | 12/2021 | Lim et al. |
| 2021/0401685 | A1 | 12/2021 | Martínez Rovira et al. |
| 2022/0030874 | A1 | 2/2022 | Castaño Meneses et al. |
| 2022/0091066 | A1 | 3/2022 | Lim et al. |
| 2022/0185676 | A1 | 6/2022 | Mahiko et al. |
| 2022/0263111 | A1 | 8/2022 | Li et al. |
| 2022/0271291 | A1 | 8/2022 | Li et al. |
| 2022/0274062 | A1 | 9/2022 | Moxon et al. |
| 2022/0320515 | A1 | 10/2022 | Rogojina et al. |
| 2022/0380218 | A1 | 12/2022 | Johnson et al. |
| 2022/0407046 | A1 | 12/2022 | Gazda et al. |
| 2023/0017082 | A1 | 1/2023 | Stowell et al. |
| 2023/0019088 | A1 | 1/2023 | Montalvo et al. |
| 2023/0021737 | A1 | 1/2023 | Stowell et al. |
| 2023/0031884 | A1 | 2/2023 | Bugga et al. |
| 2023/0035035 | A1 | 2/2023 | Rogojina et al. |
| 2023/0035506 | A1 | 2/2023 | Rogojina et al. |
| 2023/0040722 | A1 | 2/2023 | Stowell et al. |
| 2023/0069456 | A1 | 3/2023 | Stowell et al. |
| 2023/0074143 | A1 | 3/2023 | Stowell et al. |
| 2023/0082231 | A1* | 3/2023 | Joo .......................... B05D 1/04<br>361/679.01 |
| 2023/0109645 | A1 | 4/2023 | Stowell et al. |
| 2023/0145800 | A1 | 5/2023 | Stowell et al. |
| 2023/0147825 | A1 | 5/2023 | Stowell et al. |
| 2023/0187744 | A1 | 6/2023 | Gazda |
| 2023/0192491 | A1 | 6/2023 | Johnson et al. |
| 2023/0192493 | A1 | 6/2023 | Johnson et al. |
| 2023/0193040 | A1 | 6/2023 | Johnson et al. |
| 2023/0193041 | A1 | 6/2023 | Johnson et al. |
| 2023/0212729 | A1 | 7/2023 | Stowell et al. |
| 2023/0275257 | A1 | 8/2023 | Bell et al. |
| 2023/0278863 | A1 | 9/2023 | Johnson et al. |
| 2023/0278864 | A1 | 9/2023 | Johnson et al. |
| 2023/0278865 | A1 | 9/2023 | Johnson et al. |
| 2023/0278866 | A1 | 9/2023 | Johnson et al. |
| 2023/0278867 | A1 | 9/2023 | Johnson et al. |
| 2023/0278869 | A1 | 9/2023 | Johnson et al. |
| 2023/0278870 | A1 | 9/2023 | Johnson et al. |
| 2023/0278871 | A1 | 9/2023 | Johnson et al. |
| 2023/0278872 | A1 | 9/2023 | Johnson et al. |
| 2023/0278873 | A1 | 9/2023 | Johnson et al. |
| 2023/0287197 | A1 | 9/2023 | Anzelmo et al. |
| 2023/0296479 | A1 | 9/2023 | Stowell et al. |
| 2023/0373866 | A1 | 11/2023 | Johnson et al. |
| 2023/0373867 | A1 | 11/2023 | Johnson et al. |
| 2023/0382736 | A1 | 11/2023 | Johnson et al. |
| 2023/0392541 | A1 | 12/2023 | Johnson et al. |
| 2023/0399564 | A1 | 12/2023 | Edler et al. |
| 2024/0052954 | A1 | 2/2024 | Banerji et al. |
| 2024/0180960 | A1 | 6/2024 | Petrello et al. |
| 2024/0181060 | A1 | 6/2024 | Johnson et al. |
| 2024/0181061 | A1 | 6/2024 | Johnnson et al. |

FOREIGN PATENT DOCUMENTS

| | | | |
|---|---|---|---|
| BY | 10010 | C1 | 12/2007 |
| BY | 21633 | C1 | 2/2018 |
| CN | 105600780 | A | 5/2016 |
| CN | 105836729 | A | 8/2016 |
| CN | 106328909 | A | 1/2017 |
| CN | 106532026 | A | 3/2017 |
| CN | 107161978 | A | 9/2017 |
| CN | 107416819 | A | 12/2017 |
| CN | 107579203 | A | 1/2018 |
| CN | 108199058 | A | 6/2018 |
| CN | 108352493 | A | 7/2018 |
| CN | 108658061 | A | 10/2018 |
| CN | 109516452 | A | 3/2019 |
| CN | 110327372 | A | 10/2019 |
| CN | 110451514 | A | 11/2019 |
| CN | 110734077 | A | 1/2020 |
| CN | 110787827 | A | 2/2020 |
| CN | 108383102 | B | 4/2020 |
| CN | 108946710 | B | 4/2020 |
| CN | 111186830 | A | 5/2020 |
| CN | 111196602 | A | 5/2020 |
| CN | 111467499 | A | 7/2020 |
| CN | 112079349 | A | 12/2020 |
| CN | 109200059 | B | 3/2021 |
| CN | 112645312 | A | 4/2021 |
| CN | 116043186 | A | 5/2023 |
| CN | 116075361 | A | 5/2023 |
| CN | 116234942 | A | 6/2023 |
| EA | 11588 | B1 | 4/2009 |
| EP | 2857550 | A1 | 4/2015 |
| EP | 3213349 | B1 | 6/2019 |
| EP | 2489088 | B1 | 7/2019 |
| EP | 3950586 | A1 | 2/2022 |
| EP | 4230774 | A1 | 8/2023 |
| EP | 3914744 | B1 | 12/2023 |
| GB | 2618142 | A | 11/2023 |
| JP | H0578173 | A | 3/1993 |
| JP | H05070115 | A | 3/1993 |
| JP | 2003335508 | A | 11/2003 |
| JP | 2004526652 | A | 9/2004 |
| JP | 2007091495 | A | 4/2007 |
| JP | 2009274952 | A | 11/2009 |
| JP | 2010052972 | A | 3/2010 |
| JP | 5578640 | B2 | 8/2014 |
| JP | 2015050245 | A | 3/2015 |
| JP | 2015189606 | A | 11/2015 |
| JP | 6097908 | B2 | 3/2017 |
| JP | 2017045639 | A | 3/2017 |
| JP | 2017197424 | A | 11/2017 |
| JP | 2018504341 | A | 2/2018 |
| JP | 2018037617 | A | 3/2018 |
| JP | 2018048368 | A | 3/2018 |
| JP | 6455942 | B2 | 1/2019 |

(56) References Cited

FOREIGN PATENT DOCUMENTS

| | | | |
|---|---|---|---|
| JP | 2020506153 | A | 2/2020 |
| JP | 6754355 | B2 | 9/2020 |
| JP | 2021120331 | A | 8/2021 |
| JP | 6934149 | B2 | 9/2021 |
| JP | 7041421 | B2 | 3/2022 |
| KR | 1020110030570 | A | 3/2011 |
| KR | 101451140 | B1 | 10/2014 |
| KR | 20150121680 | A | 10/2015 |
| KR | 1020150124636 | A | 11/2015 |
| KR | 1020160050926 | A | 5/2016 |
| KR | 20170044836 | A | 4/2017 |
| KR | 1020200039715 | A | 4/2020 |
| KR | 20210088074 | A | 7/2021 |
| KR | 20210105107 | A | 8/2021 |
| KR | 20210113319 | A | 9/2021 |
| KR | 1020210144756 | A | 11/2021 |
| RU | 2393276 | C1 | 6/2010 |
| RU | 2591942 | C2 | 7/2016 |
| RU | 2641829 | C1 | 1/2018 |
| RU | 2658036 | C1 | 6/2018 |
| TW | 201834965 | A | 10/2018 |
| TW | 202104076 | A | 2/2021 |
| TW | 202218224 | A | 5/2022 |
| WO | 2010003922 | A1 | 1/2010 |
| WO | 2010049637 | A1 | 5/2010 |
| WO | 2010110153 | A1 | 9/2010 |
| WO | 2014011402 | A1 | 1/2014 |
| WO | 2014052376 | A1 | 4/2014 |
| WO | 2014077507 | A1 | 5/2014 |
| WO | 2015009758 | A1 | 1/2015 |
| WO | 2015025147 | A1 | 2/2015 |
| WO | 2015049624 | A1 | 4/2015 |
| WO | 2015059718 | A1 | 4/2015 |
| WO | 2016002277 | A1 | 1/2016 |
| WO | 2016011223 | A1 | 1/2016 |
| WO | 2016175195 | A1 | 11/2016 |
| WO | 2017009040 | A1 | 1/2017 |
| WO | 2018148044 | A2 | 8/2018 |
| WO | 2019014212 | A1 | 1/2019 |
| WO | 2019126782 | A1 | 6/2019 |
| WO | 2020092449 | A1 | 5/2020 |
| WO | 2020257229 | A2 | 12/2020 |
| WO | 2021080664 | A1 | 4/2021 |
| WO | 2021158395 | A1 | 8/2021 |
| WO | 2021168444 | A1 | 8/2021 |
| WO | 2021183931 | A1 | 9/2021 |
| WO | 2021237282 | A1 | 12/2021 |
| WO | 2022080142 | A1 | 4/2022 |
| WO | 2022086611 | A1 | 4/2022 |
| WO | 2022212114 | A1 | 10/2022 |
| WO | 2022216403 | A1 | 10/2022 |
| WO | 2022223668 | A1 | 10/2022 |
| WO | 2022246443 | A1 | 11/2022 |
| WO | 2022266393 | A1 | 12/2022 |
| WO | 2023003893 | A1 | 1/2023 |
| WO | 2023004060 | A2 | 1/2023 |
| WO | 2023023187 | A1 | 2/2023 |
| WO | 2023039204 | A1 | 3/2023 |
| WO | 2023090990 | A1 | 5/2023 |
| WO | 2023122652 | A1 | 6/2023 |
| WO | 2023122658 | A1 | 6/2023 |
| WO | 2023122660 | A1 | 6/2023 |
| WO | 2023122664 | A1 | 6/2023 |
| WO | 2023122668 | A1 | 6/2023 |
| WO | 2023168219 | A1 | 9/2023 |
| WO | 2023168220 | A1 | 9/2023 |
| WO | 2023168221 | A1 | 9/2023 |
| WO | 2023168223 | A1 | 9/2023 |
| WO | 2023168224 | A1 | 9/2023 |
| WO | 2023168225 | A1 | 9/2023 |
| WO | 2023168228 | A1 | 9/2023 |
| WO | 2023168229 | A1 | 9/2023 |
| WO | 2023168230 | A1 | 9/2023 |
| WO | 2023168231 | A1 | 9/2023 |
| WO | 2023168263 | A1 | 9/2023 |
| WO | 2023173027 | A1 | 9/2023 |
| WO | 2023173045 | A1 | 9/2023 |
| WO | 2023225285 | A1 | 11/2023 |
| WO | 2023225290 | A1 | 11/2023 |
| WO | 2023229933 | A1 | 11/2023 |
| WO | 2024123779 | A1 | 6/2024 |
| WO | 2024123782 | A1 | 6/2024 |
| WO | 2024123787 | A1 | 6/2024 |

OTHER PUBLICATIONS

International Preliminary Report on Patentability for PCT Application No. PCT/US2023/022899, dated Dec. 5, 2024, 8 pages.

International Preliminary Report on Patentability for PCT Application No. PCT/US2023/082529, dated Jun. 19, 2025, 9 pages.

International Preliminary Report on Patentability for PCT Application No. PCT/US2023/082535, dated Jun. 19, 2025, 8 pages.

International Preliminary Report on Patentability for PCT Application No. PCT/US2023/082541, dated Jun. 19, 2025, 8 pages.

International Search Report and Written Opinion for PCT Application No. PCT/US2022/072424, dated Sep. 6, 2022, 9 pages.

Hassani, et al., A simple synthesis of sulfur-doped graphene using sulfur powder by chemical vapor deposition, RDC Adv. 2016; 6: 27159-27163 (Year: 2016).

International Preliminary Report on Patentability for PCT Application No. PCT/US2023/063427, dated Sep. 19, 2024, 7 pages.

International Preliminary Report on Patentability for PCT Application No. PCT/US2023/063428, dated Sep. 19, 2024, 6 pages.

International Preliminary Report on Patentability for PCT Application No. PCT/US2023/063430, dated Sep. 19, 2024, 8 pages.

Nepal, et al., One-step synthesisof graphene via catalyst-free gas-phase hydrocarbon detonation, Nanotechnology 2013; 24: 245602, pp. 1-7, with Supporting Information. (Year 2013).

International Search Report and Written Opinion for PCT Application No. PCT/US2022/082122, dated Apr. 19, 2023, 11 pages.

International Search Report and Written Opinion for PCT Application No. PCT/US2022/082130, dated Apr. 20, 2023, 13 pages.

International Search Report and Written Opinion for PCT Application No. PCT/US2022/082134, dated Apr. 19, 2023, 11 pages.

International Preliminary Report on Patentability for PCT Application No. PCT/US2023/063431, dated Sep. 19, 2024, 8 pages.

Nitze, Florian et al., "Sulfur-doped ordered mesoporous carbons: A stability-improving sulfur host for lithium-sulfer battery cathodes," Journal of Power Sources, 317, dated 2016, pp. 112-119.

International Search Report and Written Opinion for PCT Application No. PCT/US2022/082142, dated May 1, 2023, 12 pages.

Hasan, Maria et al., "Direct Chemical Vapor Deposition Synthesis of Large Area Single-Layer Brominated Graphene", The Royal Society of Chemistry, RSC Advances, May 1, 2019, pp. 13527-13532, vol. 9.

Xiaorong, Zou et al., "A Method for Selective Bromination of Graphene and its Use for Subsequent Functionalization with Aromatic Molecules", Materials Research Express, Feb. 28, 2017, pp. 1-8, vol. 4, IOP Science.

Lisichkin, G. V.et al., "Halogenation of Detonation-Synthesised Nanodiamond Surfaces", Mendeleev Communications, Jan. 27, 2009, pp. 309-310, vol. 19, No. 6. ScienceDirect.

Zhan, Y. et al., "Iodine Doped Graphene as Anode Material for Lithium Ion Battery", Carbon, Mar. 13, 2015, pp. 1-8, vol. 94.

Chen, Z. et al., "Oxygen-Doped Hierarchical Porous Carbon with Improved Selectivity of Hydrogen Peroxide in an Oxygen Reduction Reaction", Energy & Fuels, May 15, 2021, pp. 2665-2673, vol. 35.

Tavakol, H. et al. "Synthesis of Multi-Walled Phosphorus and Sulfur Co-Doped CNTs" Fullerenes, Nanotubes and Carbon Nanostructures, Oct. 22, 2018, pp. 715-721, vol. 26, No. 11.

Pappas, G. S. et al., "Heteroatom Doped-Carbon Nanospheres as Anodes in Lithium Ion Batteries", Materials, Jan. 9, 2016, pp. 1-13, vol. 9. MDPI, Basel Switzerland.

Wang, X. et al., "Heteroatom-Doped Graphene Materials: Syntheses, Properties and Applications", Chemical Society Reviews, Jun. 23, 2014, pp. 7067-7098, vol. 43.

(56) References Cited

OTHER PUBLICATIONS

Kaushal, S. et al., "Heteroatom-Doped Graphene as Sensing Materials: A Mini Review", RSC Advances, Aug. 4, 2020, pp. 28608-28629, vol. 10.
Lubwama, M. et al. "Characteristics and Tribological Performance of DLC and Si-DLC Films Deposited on Nitrile Rubber", Surface and Coatings Technology, May 12, 2012, pp. 4584-4593, vol. 206.
Qian, Z. et al., "Si-Doped Carbon Quantum Dots: a Facile and General Preparation Strategy, Bioimaging Application, and Multifunctional Sensor", ACS Applied Materials & Interfaces, Apr., 8, 2014, pp. 6797-6805, vol. 6, No. 9.
Tachikawa, H. et al, "Hydrogen Storage Mechanism in Sodium-Based Graphene Nanoflakes: A Density Functional Theory Study", Hydrogen, Jan. 19, 2022, pp. 43-52, vol. 3, No. 1. MDPI, Basel, Switzerland.
Márkus, B. G. et al., "Ultralong Spin Lifetime in Light Alkali Atom Doped Graphene", ACS Nano, Jun. 2, 2020, pp. 7492-7501, No. 14. ACS Publications.
International Search Report and Written Opinion for PCT Application No. PCT/US2023/063417, dated Jun. 9, 2023, 11 pages.
International Search Report and Written Opinion for PCT Application No. PCT/US2023/063419, dated Jun. 20, 2023, 10 pages.
International Search Report and Written Opinion for PCT Application No. PCT/US2023/063420, dated Jun. 8, 2023, 11 pages.
International Search Report and Written Opinion for PCT Application No. PCT/US2023/063422, dated Jun. 15, 2023, 11 pages.
International Search Report and Written Opinion for PCT Application No. PCT/US2023/063423, dated Jun. 15, 2023, 11 pages.
International Search Report and Written Opinion for PCT Application No. PCT/US2023/063424, dated Jun. 15, 2023, 11 pages.
International Search Report and Written Opinion for PCT Application No. PCT/US2023/063427, dated Jun. 20, 2023, 10 pages.
International Search Report and Written Opinion for PCT Application No. PCT/US2023/063428, dated Jun. 20, 2023, 9 pages.
International Search Report and Written Opinion for PCT Application No. PCT/US2023/063430, dated Jun. 15, 2023, 11 pages.
International Search Report and Written Opinion for PCT Application No. PCT/US2023/063431, dated Jun. 15, 2023, 11 pages.
International Search Report and Written Opinion for PCT Application No. PCT/US2023/022885, dated Sep. 12, 2023, 11 pages.
International Search Report and Written Opinion for PCT Application No. PCT/US2023/022892, dated Sep. 7, 2023, 11 pages.
International Search Report and Written Opinion for PCT Application No. PCT/US2023/022899, dated Sep. 5, 2023, 11 pages.
International Search Report and Written Opinion for PCT Application No. PCT/US2023/082529, dated Apr. 9, 2024, 13 pages.
International Search Report and Written Opinion for PCT Application No. PCT/US2023/082535, dated Apr. 24, 2024, 11 pages.
International Search Report and Written Opinion for PCT Application No. PCT/US2023/082541, dated Apr. 12, 2024, 12 pages.
Tang et al. "Versatile carbon nanoplatforms for cancer treatment and diagnosis: strategies, applications and future perspectives.", Theranostics, 2022(Epub. Feb. 21, 2022), vol. 12, issue 5, pp. 2290-2321.
Rejinold et al, "Radio frequency responsive nano-biomaterials for cancer therapy", Journal of Controlled Release, 2015, vol. 204, pp. 85-97.
Pumprla et al., "Non-contact radiofrequency-induced reduction of subcutaneous abdominal fat correlates with initial cardiovascular autonomic balance and fat tissue hormones: safety analysis." F1000Res. Feb. 20, 2015; Version 1, 4:49. doi: 10.12688/f1000research.5708.1. PMID: 26069728; PMCID: PMC4431383, pp. 1-20, <https://www.ncbi.nlm.nih.gov/pmc/articles/PMC4431383/>.
International Preliminary Report on Patentability for PCT Application No. PCT/US2022/072424, dated Nov. 30, 2023, 7 pages.
International Preliminary Report on Patentability for PCT Application No. PCT/US2022/082122, dated Jul. 4, 2024, 8 pages.
International Preliminary Report on Patentability for PCT Application No. PCT/US2022/082130, dated Jul. 4, 2024, 9 pages.
International Preliminary Report on Patentability for PCT Application No. PCT/US2022/082134, dated Jul. 4, 2024, 8 pages.
International Preliminary Report on Patentability for PCT Application No. PCT/US2022/082138, dated Jul. 4, 2024, 8 pages.
International Preliminary Report on Patentability for PCT Application No. PCT/US2022/082142, dated Jul. 4, 2024, 8 pages.
Chen, Xi'an et al., "Sulfur-doped porous reduced graphene oxide hollow nanospheres framework as metal-free electrocatalysts for oxygen reduction reaction and supercapacitor electrode materials," Nanoscale, Sep. 2014, DOI: 10.1039/C4NR04783D, The Royal Society of Chemistry, pp. 1-7.
You, Chenghang et al., "Uniform nitrogen and sulfur co-doped carbonnanospheres as catalysts for the oxygenreduction reaction," Carbon, vol. 69, Apr. 2014, pp. 294-301.
Nepal, Arjun et al., "One-step synthesis of graphene via catalyst-free gas-phase hydrocarbon detonation," IOP Science, Nanotechnology, vol. 24, No. 24, published May 20, 2013, 3 pages <https://iopscience.iop.org/article/10.1088/0957-4484/24/24/245602>.
Galeon, Dom, "We May Finally Have a Way of Mass Producing Graphene," Futurism, dated Jan. 28, 2017, 7 pages, <https://futurism.com/we-may-finally-have-a-way-of-mass-producing-graphene>.
"Graphene Mass Produce," Google Search, <https://www.google.com/search?q=graphene*mass*produce&ie=UTF-8&oe=UTF-8&hl=en-us&client=safari>.
<https://firstgraphene.net/>.
<https://www.jmtour.com/media/Flash%20Graphene%20Video%20Rice%20University%202019.mp4>.
Ramirez, Giovanni et al., "Tribochemical Conversion of Methane to Graphene and Other Carbon Nanostructures: Implications for Friction and Wear," ACS Appl. Nano Mater., 2020, 3, 8, 8060-8067, Abstract only.
Wang, Feng et al., "High-purity few-layer graphene from plasma pyrolysis of methane as conductive additive for LiFePO4 lithium ion battery," Journal of Materials Research and Technology, vol. 9, Issue 5, Sep.-Oct. 2020, pp. 10004-10015.
Sorensen, Chris, "Physicists patent detonation technique to mass-produce graphene," Kansas State University, dated Jan. 25, 2017, 4 pages, <https://phys.org/news/2017-01-physicists-patent-detonation-technique-mass-produce.html>.
<https://scx2.b-cdn.net/gfx/news/2017/1-physicistspa.jpg>.
Zhakeyev, Adilet et al., "Additive Manufacturing: Unlocking the Evolution of Energy Materials," Advanced Science, vol. 4, Issue 10, published Jul. 25, 2017, 115 pages.
"Patented process converts petroleum feedstock to graphite, graphene and green hydrogen," First Graphene, ASX Announcement, dated Apr. 20, 2021, 2 pages.
Jiao, Yong et al., "High-performance triboelectric nanogenerators based onblade-coating lead halide perovskite film andelectrospinning PVDF/graphene nanofiber," Chemical Engineering Journal, vol. 483, Mar. 1, 2024, 149442, pp. 1-6.
"Focus on additives: Harnessing the power of graphene incoatings and paints", Polymers Paint Colour Journal, Feb. 20, 2024, pp. 1-11.
Kumar, Vijay et al., "Cavitation-corrosion analysis of HVOF-sprayed WC-Co-Cr-graphene nanoplatelets coatings with LST pre-treatment", International Journal of Refractory Metals and Hard Materials, vol. 120, Apr. 2024, 106610, pp. 1-6.
Li, Li et al., "Hydrophobic and anti-fouling novel anti-corrosion coatings of graphene quantum dots in situ doped withpolyphenylene sulfide", Surface and Coatings Technology, vol. 479, Mar. 15, 2024, 130527, pp. 1-5.
Lim, Yi Shen et al., "Nucleate boiling enhancement on hybrid graphene-nanoplatelets/carbon nanotubes coatings for light-emittingdiode cooling", Applied Thermal Engineering, vol. 244, May, 1, 2024, 122785, pp. 1-27.
Mourya, Punita et al., "Epoxy coating reinforced with graphene-PANI nanocomposites for enhancement of corrosion-resistanceperformance of mild steel in saline water", Colloids and Surfaces A: Physicochemical and Engineering Aspects, vol. 687, Apr. 20, 2024, 133500, pp. 1-6.
Pandey, Usha et al., "Comparative study of graphene oxide-multifunctionaloxide doping on corrosion resistance of electrodepositednickel coatings in saline environments", International Journal of Hydrogen Energy, vol. 60, Mar. 22, 2024, pp. 165-179.

(56) References Cited

OTHER PUBLICATIONS

Pang, Wuting et al., "Graphene oxides enhanced polyurethane based compositecoating with long term corrosion resistance and self-healing property", European Polymer Journal, vol. 207, Mar. 6, 2024, 112825, pp. 1-5.

Sama, Deepam. "What is Graphene Coating?Here's everything you must know", pp. 1-13. < https://www.carzspa.com/what-is-graphene-coating/>.

Selim, Mohamed S. et al., "Hierarchical biocide-free silicone/graphene-silicon carbidenanocomposite coatings for marine anti-fouling andsuperhydrophobicity of ship hulls", Chemical Engineering Science, vol. 291, Jun. 5, 2024, 119929, pp. 1-7.

SY, Kim et al. "In-situ microscopy-assisted meniscus-guided coating forhighly sensitive reduced graphene oxide-basednanocomposite biosensor", Europe PMC Plus, Feb. 22, 2024, pp. 1-2.

GMG Provides Commercialisation Update on Energy SavingsCoating THERMAL-XR® (/blogpost/1501180/497649/GMG-Provides-Commercialisation-Update-on-Energy-Savings-Coating-THERMAL-XR), Feb. 2, 2024, pp. 1-6. <https://www.thegraphenecouncil.org/blogpost/1501180/497649/GMG-Provides-Commercialisation-Update-on-Energy-Savings-Coating-THERMAL-XR>.

Xie, Chan et al. "Long-lasting anti-corrosion of superhydrophobic coating bysynergistic modification of graphene oxide withpolydopamine and cerium oxide", Construction and Building Materials, vol. 418, Mar. 8, 2024, 135283, pp. 1-5.

Cao, M.J. et al. "Research progress on graphene production by methane cracking: approach and growth mechanism", Materials Today Sustainability, vol. 24, Aug. 30, 2023, pp. 1-20.

International Search Report and Written Opinion for PCT Application No. PCT/US2022/082138, dated May 1, 2023, 11 pages.

Choma et al., "Development of Mesoporosity in Carbon Spheres Obtained by Stober Method", Microporous and Mesoporous Materials 185 (2014), 197-203. (Year: 2014).

Extended European Search Report for EP Application No. 22912691.7, dated Nov. 7, 2025, 8 pages.

Extended European Search Report for EP Application No. 22912695.8, dated Nov. 18, 2025, 9 pages.

Extended European Search Report for EP Application No. 22912697.4, dated Nov. 25, 2025, 10 pages.

Extended European Search Report for EP Application No. 22912699.0, dated Dec. 1, 2025, 10 pages.

Extended European Search Report for EP Application No. 22912702.2, dated Dec. 10, 2025, 7 pages.

Extended European Search Report for EP Application No. 23764054.5, dated Feb. 2, 2026, 14 pages.

Osswald, S., Yushin, G., Mochalin, V., Kucheyev, S.O., & Gogotsi, Y. (2006), "Control of sp2/sp3 carbon ratio and surface chemistry of nanodiamond powders by selective oxidation in Air," Journal of the American Chemical Society, 128(35), 11635-11642, <https://doi.org/10.1021/ja063303n> (Year: 2006).

Zou et al., "A Composite Consisting of Bromine-Doped Carbon Dots and Ferric Ions as a Fluorescent Probe for Determination and Intracellular Imaging of Phosphate," Microchimica Acta 186, Jul. 2019, 1-9 (Year: 2019).

Zhou et al., "Facile Synthesis of Halogenated Carbon Quantum Dots as an Important Intermediate for Surface Modification," RSC Adv., Apr. 3, 2013, 9625-9628 (Year: 2013).

Knoblauch et al., "Heavy Carbon Nanodots: A New Phosphorescent Carbon Nanostructure," Phys. Chem. Chem. Phys., May 20, 2018, 15518-15527 (Year: 2018).

Huang, C. et al., "Phosphorus, Nitrogen and Oxygen Co-Doped Polymer-Based Core-Shell Carbon Sphere for High-Performance Hybrid Supercapacitors," Electrochimica Acta, vol. 270, dated Apr. 20, 2018, pp. 339-351.

Ye, Zhengqing et al., "Nitrogen and oxygen-codoped carbon nanospheres for excellent specific capacitance and cyclic stability supercapacitor electrodes," Chemical Engineering Journal, vol. 330 (2017) pp. 1166-1173.

Deng, H. et al, "Radial Pores in Nitrogen/Oxygen Dual-Doped Carbon Nanospheres Anode Boost High-Power and Ultrastable Potassium-Ion Batteries," Advanced Functional Materials, vol. 31, Issue 51, (2021), pp. 1-11.

Zhang, Xu et al., "Impact of Chlorine Functionalization on High-Mobility Chemical Vapor Deposition Grown Graphene," ACS Nano, American Chemical Society, vol. 7, No. 8, dated 2013, pp. 7262-7270.

Spicer, P.T. et al., "Flame Synthesis of Composite Carbon Black-Fumed Silica Nanostructured Particles", Journal of Aerosol Science, Elmsford, NY, US, vol. 29, No. 5/06, Jun. 1, 1998, pp. 647-659.

Vital, Andri et al., "One-Step Flame Synthesis of Ultrafine SiO2—C Nanocomposite Particles with High Carbon Loading and Their Carbothermal Conversion," Industrial & Engineering Chemistry Research, vol. 46, No. 12, Jun. 1, 2007, pp. 4273-4281.

Extended European Search Report for EP Application No. 23764053.7, dated Mar. 18, 2026, 10 pages.

Liu, Ziwu et al., "Preparation of Phosphorus-Doped Carbon Nanospheres and Their Electrocatalytic Performance for O2 Reduction," Journal of Natural Gas Chemistry, vol. 21, No. 3, May 1, 2012, pp. 257-264.

Wu, Jiao et al., "Synthesis of Phosphorus-Doped Carbon Hollow Spheres as Efficient Metal-Free Electrocatalysts for Oxygen Reduction," Carbon, Elsevier Oxford, GB, vol. 82, Nov. 11, 2014, pp. 562-571.

Tavakol, Hossein et al., "Synthesis of Multi-Walled Phosphorus and Sulfur Co-Doped CNTs," Fullerenes, Nanotubes and Carbon Nanostructures, vol. 26, No. 11, Oct. 22, 2018, pp. 715-721.

Nie, Baisheng et al., "Soot Characteristic and Formation Mechanism in the Process of Gas Explosion," Transactions of Beijing Institute of Technology, No. 4, 2017, pp. 424-429.

Batraev et al., "Investigation of Gas Detonation in Over-Rich Mixtures of Hydrocarbons with Oxygen," Combustion, Explosion, and Shock Waves, vol. 54, No. 2, Mar.-Apr. 2018, pp. 207-215.

* cited by examiner

CARBON-BASED NANOMATERIAL COMPOSITION AND METHODS OF FORMING THE SAME FROM A GAS MIXTURE THAT INCLUDES ACETYLENE AND METHANE GAS

CROSS-REFERENCE TO RELATED APPLICATION(S)

This application claims priority under 35 U.S.C. § 119(e) to U.S. Provisional Patent Application No. 63/292,603, entitled "GRAPHENE COMPOSITION AND METHODS OF FORMING THE SAME FROM A GAS MIXTURE THAT INCLUDES ACETYLENE AND METHANE GAS," by Evan JOHNSON et al., filed Dec. 22, 2021, and claims priority under 35 U.S.C. § 119(e) to U.S. Provisional Patent Application No. 63/379,313, entitled "CARBON-BASED NANOMATERIAL COMPOSITION AND METHODS OF FORMING THE SAME FROM A GAS MIXTURE THAT INCLUDES ACETYLENE AND METHANE GAS," by Evan JOHNSON et al., filed Oct. 13, 2022, both of which are assigned to the current assignee hereof and are incorporated herein by reference in their entireties.

FIELD OF THE DISCLOSURE

The present disclosure relates to carbon-based nanomaterial composition and methods of forming the same. More particularly, the present disclosure relates to a method, system, and apparatus for conversion of exhaust gas into carbon-based nanomaterial.

BACKGROUND

It is well understood that carbon, particularly complexed in CO and $CO_2$, but in any form that can convert into a greenhouse gas, is causing worldwide temperature increases. Various technologies are being developed to capture carbon resulting from human activities, primarily industrial processes, fossil fuel and other combustion from vehicles (e.g., airplanes, cars & trucks, and commercial and residential uses).

Carbon-based materials have many desirable properties, such as high conductivity of heat and electricity along its plane, unique optical properties, and high mechanical strength. Due to these properties, carbon-based nanomaterials have a variety of applications including energy storage, electronics, semiconductors, composites, and membranes.

Existing combustion-based technologies for producing carbon-based nanomaterial carbon based materials use an oxygen-and-carbon-based gas mixture. However, these techniques do not fully and consistently break down carbon, thereby yielding an inconsistent product.

SUMMARY

According to a first aspect, a carbon-based nanomaterial composition may be formed from a gas mixture. The gas mixture may include acetylene gas at a molar ratio $AG_{mol}/GM_{mol}$ of at least about 0.25 and not greater than about 0.99, where the $AG_{mol}$ is equal to the moles of acetylene gas in the gas mixture and $GM_{mol}$ is equal to the total moles of gas in the gas mixture, oxygen gas at a molar ratio $OG_{mol}/GM_{mol}$ of at least about 0.01 and not greater than about 0.55, where the $OG_{mol}$ is equal to the moles of oxygen gas in the gas mixture and $GM_{mol}$ is equal to the total moles of gas in the gas mixture, hydrogen gas at a molar ratio $HG_{mol}/GM_{mol}$ of at least about 0.05 and not greater than about 0.75, where the $HG_{mol}$ is equal to the moles of hydrogen gas in the gas mixture and $GM_{mol}$ is equal to the total moles of gas in the gas mixture, and methane gas at a molar ratio $MG_{mol}/GM_{mol}$ of at least about 0.25 and not greater than about 0.99, where the $MG_{mol}$ is equal to the moles of methane gas in the gas mixture and $GM_{mol}$ is equal to the total moles of gas in the gas mixture. The carbon-based nanomaterial composition may have a carbon hybridization ratio $P_{sp3}/P_{sp2}$ of at least about 0.0 and not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

According to another aspect, a method of forming a carbon-based nanomaterial composition may include supplying a gas mixture, and igniting the gas mixture to form the carbon-based nanomaterial composition. The gas mixture may include acetylene gas at a molar ratio $AG_{mol}/GM_{mol}$ of at least about 0.25 and not greater than about 0.99, where the $AG_{mol}$ is equal to the moles of acetylene gas in the gas mixture and $GM_{mol}$ is equal to the total moles of gas in the gas mixture, oxygen gas at a molar ratio $OG_{mol}/GM_{mol}$ of at least about 0.01 and not greater than about 0.55, where the $OG_{mol}$ is equal to the moles of oxygen gas in the gas mixture and $GM_{mol}$ is equal to the total moles of gas in the gas mixture, hydrogen gas at a molar ratio $HG_{mol}/GM_{mol}$ of at least about 0.05 and not greater than about 0.75, where the $HG_{mol}$ is equal to the moles of hydrogen gas in the gas mixture and $GM_{mol}$ is equal to the total moles of gas in the gas mixture, and methane gas at a molar ratio $MG_{mol}/GM_{mol}$ of at least about 0.25 and not greater than about 0.99, where the $MG_{mol}$ is equal to the moles of methane gas in the gas mixture and $GM_{mol}$ is equal to the total moles of gas in the gas mixture. The carbon-based nanomaterial composition may have a carbon hybridization ratio $P_{sp3}/P_{sp2}$ of at least about 0.0 and not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

According to still another aspect, a carbon-based nanomaterial composition may include a carbon content of at least about 75% and not greater than about 100% based on elemental analysis of the carbon-based nanomaterial composition, and an oxygen content of at least about 0.0% and not greater than about 25% based on elemental analysis of the carbon-based nanomaterial composition. The carbon-based nanomaterial composition may have a D/G ratio of at least about 0.1 and not greater than about 2.0. The carbon-based nanomaterial composition may further have a carbon hybridization ratio $P_{sp3}/P_{sp2}$ of at least about 0.0 and not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

According to yet another aspect, a carbon-based nanomaterial composition may include a carbon content of at least about 75% and not greater than about 100% based on elemental analysis of the carbon-based nanomaterial composition, and an oxygen content of at least about 0.0% and not greater than about 25% based on elemental analysis of the carbon-based nanomaterial composition. The carbon-based nanomaterial composition may have an aspect ratio of at least about 1 and not greater than about 50. The carbon-based nanomaterial composition may further have a carbon hybridization ratio $P_{sp3}/P_{sp2}$ of at least about 0.0 and not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a carbon-based nanomaterial composition. According to particular embodiments, the carbon-based nanomaterial composition may be defined as any carbon-based nanomaterial that may include a particular carbon content and a particular oxygen content.

Figure 1:
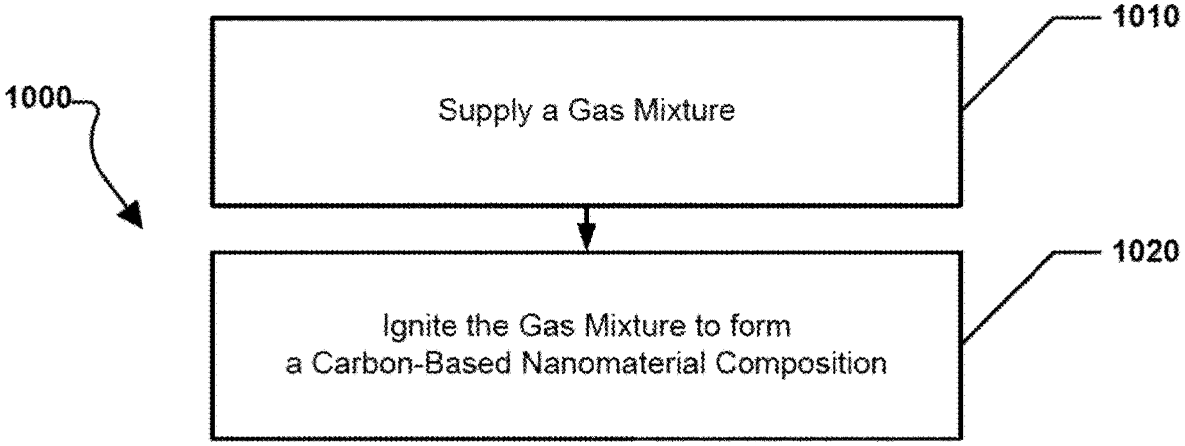
FIG. 1 includes a diagram showing a carbon-based nanomaterial composition forming method according to embodiments described herein.

Referring first to a method of forming a carbon-based nanomaterial composition, FIG. 1 includes a diagram showing a forming method 100 for forming a carbon-based nanomaterial composition according to embodiments described herein. According to particular embodiments, the forming method 1000 may include a first step 1010 of supplying a gas mixture, and a second step 1020 of igniting the gas mixture to form the carbon-based nanomaterial composition.

Referring to first step 1010, according to particular embodiments, the gas mixture may include acetylene gas, and oxygen gas. According to still other embodiments, the gas mixture may further include hydrogen gas.

According to a certain embodiment, the gas mixture may include a particular molar ratio $AG_{mol}/GM_{mol}$, where the $AG_{mol}$ is equal to the moles of acetylene gas in the gas mixture and $GM_{mol}$ is equal to the total moles of gas in the gas mixture. For example, the gas mixture may include a molar ratio $AG_{mol}/GM_{mol}$ of at least about 0.25, such as, at least about 0.26 or at least about 0.27 or at least about 0.28 or at least about 0.29 or at least about 0.30 or at least about 0.31 or at least about 0.32 or at least about 0.33 or at least about 0.34 or even at least about 0.35.

According to still other embodiments, the gas mixture may include a molar ratio $AG_{mol}/GM_{mol}$ of not greater than about 0.99, such as, not greater than about 0.95 or not greater than about 0.90 or not greater than about 0.85 or not greater than about 0.80 or not greater than about 0.75 or not greater than about 0.70 or not greater than about 0.65 or even not greater than about 0.60. It will be appreciated that the gas mixture may include a molar ratio $AG_{mol}/GM_{mol}$ of any value between, and including, any of the minimum and maximum values noted above. It will be further appreciated that the gas mixture may include a molar ratio $AG_{mol}/GM_{mol}$ within a range between, and including, any of the minimum and maximum values noted above.

According to a certain embodiment, the gas mixture may include a particular molar ratio $OG_{mol}/GM_{mol}$, where the $OG_{mol}$ is equal to the moles of oxygen gas in the gas mixture and $GM_{mol}$ is equal to the total moles of gas in the gas mixture. For example, the gas mixture may include a molar ratio $OG_{mol}/GM_{mol}$ of at least about 0.01, such as, at least about 0.02 or at least about 0.03 or at least about 0.04 or at least about 0.05 or at least about 0.06 or at least about 0.07 or at least about 0.08 or at least about 0.09 or at least about 0.10 or even at least about 0.11 or at least about 0.12 or at least about 0.13 or at least about 0.14 or at least about 0.15 or at least about 0.16 or at least about 0.17 or at least about 0.18 or at least about 0.19 or at least about 0.20 or at least about 0.25 or at least about 0.30 or at least about 0.35 or even at least about 0.40. According to still other embodiments, the gas mixture may include a molar ratio $OG_{mol}/GM_{mol}$ of not greater than about 0.55, such as, not greater than about 0.54 or not greater than about 0.53 or not greater than about 0.52 or not greater than about 0.51 or even not greater than about 0.50. It will be appreciated that the gas mixture may include a molar ratio $OG_{mol}/GM_{mol}$ of any value between, and including, any of the minimum and maximum values noted above. It will be further appreciated that the gas mixture may include a molar ratio $OG_{mol}/GM_{mol}$ within a range between, and including, any of the minimum and maximum values noted above.

According to a certain embodiment, the gas mixture may include a particular molar ratio $HG_{mol}/GM_{mol}$, where the $HG_{mol}$ is equal to the moles of hydrogen gas in the gas mixture and $GM_{mol}$ is equal to the total moles of gas in the gas mixture. For example, the gas mixture may include a molar ratio $HG_{mol}/GM_{mol}$ of at least about 0.05, such as, at least about 0.10 or at least about 0.15 or at least about 0.20 or at least about 0.25 or at least about 0.30 or even at least about 0.35. According to still other embodiments, the gas mixture may include a molar ratio $HG_{mol}/GM_{mol}$ of not greater than about 0.75, such as, not greater than about 0.70 or not greater than about 0.65 or not greater than about 0.60 or not greater than about 0.55 or not greater than about 0.50 or not greater than about 0.45 or even not greater than about 0.40. It will be appreciated that the gas mixture may include a molar ratio $HG_{mol}/GM_{mol}$ of any value between, and including, any of the minimum and maximum values noted above. It will be further appreciated that the gas mixture may include a molar ratio $HG_{mol}/GM_{mol}$ within a range between, and including, any of the minimum and maximum values noted above.

According to a certain embodiment, the gas mixture may include a particular molar ratio $MG_{mol}/GM_{mol}$, where the $MG_{mol}$ is equal to the moles of methane gas in the gas mixture and $GM_{mol}$ is equal to the total moles of gas in the gas mixture. For example, the gas mixture may include a molar ratio $MG_{mol}/GM_{mol}$ of at least about 0.25, such as, at least about 0.26 or at least about 0.27 or at least about 0.28 or at least about 0.29 or at least about 0.30 or at least about 0.31 or at least about 0.32 or at least about 0.33 or at least about 0.34 or even at least about 0.35. According to still other embodiments, the gas mixture may include a molar ratio $MG_{mol}/GM_{mol}$ of not greater than about 0.99, such as, not greater than about 0.95 or not greater than about 0.90 or not greater than about 0.85 or not greater than about 0.80 or not greater than about 0.75 or not greater than about 0.70 or not greater than about 0.65 or even not greater than about 0.60. It will be appreciated that the gas mixture may include a molar ratio $MG_{mol}/GM_{mol}$ of any value between, and including, any of the minimum and maximum values noted above. It will be further appreciated that the gas mixture may include a molar ratio $MG_{mol}/GM_{mol}$ within a range between, and including, any of the minimum and maximum values noted above.

According to particular embodiments, the gas mixture may include a particular content of acetylene gas. For example, the gas mixture may include acetylene gas at a concentration of at least about 1.2 mol, such as, at least about 1.4 mol or at least about 1.6 mol or at least about 1.8 mol or at least about 2.0 mol or at least about 2.05 mol or at least about 2.06 mol or at least about 2.07 mol or at least about 2.08 mol or at least about 2.09 mol or at least about 2.10 mol or at least about 2.11 mol or at least about 2.12 mol or at least about 2.13 mol or at least about 2.14 mol or at least about 2.15 mol or at least about 2.16 mol or at least about 2.17 mol or at least about 2.18 mol or at least about 2.19 mol or at least about 2.20 mol or at least about 2.25 mol or at least about 2.30 mol or at least about 2.35 mol or at least about 2.40 mol or at least about 2.45 mol or at least about 2.50 mol or at least about 2.75 mol or at least about 3.0 mol or at least about 3.5 mol or at least about 4.0 mol or at least about 4.5 mol or at least about 5.0 mol or at least about 5.5 mol or at least about 6.0 mol or even at least about 6.5 mol. According to still other embodiments, the gas mixture may include acetylene gas at a concentration of not greater than about 12 mol, such as, not greater than about 11.5 mol or not greater than about 11.0 mol or not greater than about 10.5 mol or not greater than about 10.0 mol or not greater than about 9.5 mol or not greater than about 9.0 mol or not greater than about 8.5 mol or not greater than about 8.0 mol or not greater than about 7.5 mol or even not greater than about 7.0 mol. It will be appreciated that the acetylene gas concentration in the gas mixture may be any value between, and including, any of the minimum and maximum values noted above. It will be further appreciated that the acetylene gas concentration in the gas mixture may be within a range between, and including, any of the minimum and maximum values noted above.

According to other embodiments, the gas mixture may include a particular content of oxygen gas. For example, the gas mixture may include oxygen gas at a concentration of at least about 0.3 mol, such as, at least about 0.31 mol or at least about 0.32 mol or at least about 0.33 mol or at least about 0.34 mol or at least about 0.35 mol or at least about 0.36 mol or at least about 0.37 mol or at least about 0.38 mol or at least about 0.39 mol or at least about 0.40 mol or at least about 0.41 mol or at least about 0.42 mol or at least about 0.43 mol or at least about 0.44 mol or at least about 0.45 mol or at least about 0.46 mol or at least about 0.47 mol or at least about 0.48 mol or even at least about 0.49 mol. According to still other embodiments, the gas mixture may include oxygen gas at a concentration of not greater than about 2.5 mol, such as, not greater than about 2.25 mol or not greater than about 2.0 mol or not greater than about 1.75 mol or not greater than about 1.5 mol or not greater than about 1.25 mol or not greater than about 1.0 mol or not greater than about 0.75 mol or even not greater than about 0.5 mol. It will be appreciated that the oxygen gas concentration in the gas mixture may be any value between, and including, any of the minimum and maximum values noted above. It will be further appreciated that the oxygen gas concentration in the gas mixture may be within a range between, and including, any of the minimum and maximum values noted above.

According to still other embodiments, the gas mixture may include a particular content of hydrogen gas. For example, the gas mixture may include hydrogen gas at a concentration of at least about 0.60 mol, such as, at least about 0.61 mol or at least about 0.62 mol or at least about 0.63 mol or at least about 0.64 mol or at least about 0.65 mol or at least about 0.66 mol or at least about 0.67 mol or at least about 0.68 mol or at least about 0.69 mol or at least about 0.70 mol or at least about 0.71 mol or at least about 0.72 mol or at least about 0.73 mol or at least about 0.74 mol or at least about 0.75 mol or at least about 0.76 mol or at least about 0.77 mol or at least about 0.78 mol or at least about 0.79 mol or even at least about 0.80 mol. According to still other embodiments, the gas mixture may include hydrogen gas at a concentration of not greater than about 5.0 mol, such as, not greater than about 5.5 mol or not greater than about 5.0 mol or not greater than about 4.5 mol or not greater than about 4.0 mol or not greater than about 3.5 mol or not greater than about 3.0 mol or not greater than about 2.5 mol or not greater than about 2.0 mol or not greater than about 1.5 mol or even not greater than about 1.0 mol. It will be appreciated that the hydrogen gas concentration in the gas mixture may be any value between, and including, any of the minimum and maximum values noted above. It will be further appreciated that the hydrogen gas concentration in the gas mixture may be within a range between, and including, any of the minimum and maximum values noted above.

According to particular embodiments, the gas mixture may include a particular content of methane gas. For example, the gas mixture may include methane gas at a concentration of at least about 1.2 mol, such as, at least about 1.4 mol or at least about 1.6 mol or at least about 1.8 mol or at least about 2.0 mol or at least about 2.05 mol or at least about 2.06 mol or at least about 2.07 mol or at least about 2.08 mol or at least about 2.09 mol or at least about 2.10 mol or at least about 2.11 mol or at least about 2.12 mol or at least about 2.13 mol or at least about 2.14 mol or at least about 2.15 mol or at least about 2.16 mol or at least about 2.17 mol or at least about 2.18 mol or at least about 2.19 mol or at least about 2.20 mol or at least about 2.25 mol or at least about 2.30 mol or at least about 2.35 mol or at least about 2.40 mol or at least about 2.45 mol or at least about 2.50 mol or at least about 2.75 mol or at least about 3.0 mol or at least about 3.5 mol or at least about 4.0 mol or at least about 4.5 mol or at least about 5.0 mol or at least about 5.5 mol or at least about 6.0 mol or even at least about 6.5 mol. According to still other embodiments, the gas mixture may include methane gas at a concentration of not greater than about 12 mol, such as, not greater than about 11.5 mol or not greater than about 11.0 mol or not greater than about 10.5 mol or not greater than about 10.0 mol or not greater than about 9.5 mol or not greater than about 9.0 mol or not greater than about 8.5 mol or not greater than about 8.0 mol or not greater than about 7.5 mol or even not greater than about 7.0 mol. It will be appreciated that the methane gas concentration in the gas mixture may be any value between, and including, any of the minimum and maximum values noted above. It will be further appreciated that the methane gas concentration in the gas mixture may be within a range between, and including, any of the minimum and maximum values noted above.

Referring now to embodiments of the carbon-based nanomaterial composition formed according to forming method 100, the carbon-based nanomaterial composition may include particular carbon content based on elemental analysis conducted using x-ray photoelectron spectroscopy (XPS). For example, the carbon-based nanomaterial composition may include a carbon content of at least about 75.0%, such as, at least about 78.0% or at least about 80.0% or at least about 83% or at least about 85% or at least about 88% or at least about 90% or at least about 91% or at least about 92% or at least about 93% or at least about 94.0% or even at least about 95.0%. According to still other embodiments, the carbon-based nanomaterial composition may include a carbon content of not greater than about 100%, such as, not greater than about 99.5% or not greater than about 99% or not greater than about 98.5% or not greater than about 98% or not greater than about 97.5% or not greater than about 97% or not greater than about 96.5% or even not greater than about 96.0%. It will be appreciated that the carbon content in the carbon-based nanomaterial composition may be any value between, and including, any of the minimum and maximum values noted above. It will be further appreciated that the carbon content in the carbon-based nanomaterial composition may be within a range between, and including, any of the minimum and maximum values noted above.

According to still other embodiments, the carbon-based nanomaterial composition may include particular oxygen content based on elemental analysis conducted using x-ray photoelectron spectroscopy (XPS). For example, the carbon-based nanomaterial composition may include an oxygen content of at least about 0.0%, such as, at least about 0.5% or at least about 1.0% or at least about 1.5% or at least about 2.0% or at least about 2.5% or at least about 3.0% or at least about 3.5% or at least about 4.0% or at least about 4.5% or even at least about 5.0%. According to still other embodiments, the carbon-based nanomaterial composition may include an oxygen content of not greater than about 25%, such as, not greater than about 23% or not greater than about 20% or not greater than about 18% or not greater than about 15% or not greater than about 13% or not greater than about 10% or not greater than about 8% or even not greater than about 6.0%. It will be appreciated that the oxygen content in the carbon-based nanomaterial composition may be any value between, and including, any of the minimum and maximum values noted above. It will be further appreciated that the oxygen content in the carbon-based nanomaterial composition may be within a range between, and including, any of the minimum and maximum values noted above.

According to still other embodiments, the carbon-based nanomaterial composition may have a particular D/G ratio as measured by performing x-ray photoelectron spectroscopy on a sample of powder and detangling the spectrum produced. For example, the carbon-based nanomaterial composition may have a D/G ratio of at least about 0.1, such as, at least about 0.15 or at least about 0.20 or at least about 0.25 or at least about 0.30 or at least about 0.35 or at least about 0.40 or at least about 0.45. According to still other embodiments, the carbon-based nanomaterial composition may have a D/G ratio of not greater than about 2.0, such as, not greater than about 1.95 or not greater than about 1.90 or not greater than about 1.85 or not greater than about 1.80 or not greater than about 1.75 or not greater than about 1.70 or not greater than about 1.65 or not greater than about 1.60 or not greater than about 1.55 or not greater than about 1.50 or not greater than about 1.45 or not greater than about 1.40 or not greater than about 1.35 or not greater than about 1.30 or not greater than about 1.25 or not greater than about 1.20 or not greater than about 1.15 or not greater than about 1.10 or not greater than about 1.05 or not greater than about 1.00 or not greater than about 0.95 or not greater than about 0.9 or not greater than about 0.85 or not greater than about 0.8 or not greater than about 0.75 or not greater than about 0.7 or not greater than about 0.65 or even not greater than about 0.6. It will be appreciated that the D/G ratio of the carbon-based nanomaterial composition may be any value between, and including, any of the minimum and maximum values noted above. It will be further appreciated that the D/G ratio of the carbon-based nanomaterial composition may be within a range between, and including, any of the minimum and maximum values noted above.

According to still other embodiments, the carbon-based nanomaterial composition may have a particular aspect ratio as measured by dividing the lateral size by the thickness of a given sample. For example, the carbon-based nanomaterial composition may have an aspect ratio of at least about 1.0, such as, at least about 5 or at least about 10 or at least about 15. According to still other embodiments, the carbon-based nanomaterial composition may have an aspect ratio of not greater than about 100, such as, not greater than about 95 or not greater than about 90 or not greater than about 85 or not greater than about 80 or not greater than about 75 or not greater than about 70 or not greater than about 65 or even not greater than about 60. It will be appreciated that the aspect ratio of the carbon-based nanomaterial composition may be any value between, and including, any of the minimum and maximum values noted above. It will be further appreciated that the aspect ratio of the carbon-based nanomaterial composition may be within a range between, and including, any of the minimum and maximum values noted above.

According to yet other embodiments, the carbon-based nanomaterial composition may have a particular carbon hybridization ratio $P_{sp3}/P_{sp2}$, where $P_{sp3}$ is the percent of carbon within the carbon-based nanomaterial composition having a sp3 hybridization and $P_{sp2}$ is the percent of carbon within the carbon-based nanomaterial composition having a sp2 hybridization. For example, the carbon-based nanomaterial composition may have a carbon hybridization ratio $P_{sp3}/P_{sp2}$ of at least about 0.0, such as, at least about 0.1 or at least about 0.2 or at least about 0.3 or at least about 0.4 or at least about 0.5 or at least about 0.6 or at least about 0.7 or at least about 0.8 or at least about 0.9 or at least about 1.0 or at least about 1.1 or at least about 1.2 or at least about 1.3 or at least about 1.4 or even at least about 1.5. According to still other embodiments, the carbon-based nanomaterial composition may have a carbon hybridization ratio $P_{sp3}/P_{sp2}$ of not greater than about 5.00, such as, not greater than about 4.75 or not greater than about 4.5 or not greater than about 4.25 or not greater than about 4.0 or not greater than about 3.75 or not greater than about 3.50 or not greater than about 3.25 or not greater than about 3.0 or not greater than about 2.9 or not greater than about 2.8 or not greater than about 2.7 or not greater than about 2.6 or not greater than about 2.5 or not greater than about 2.4 or not greater than about 2.3 or not greater than about 2.2 or not greater than about 2.1 or even not greater than about 2.0. It will be appreciated that the carbon hybridization ratio $P_{sp3}/P_{sp2}$ of the carbon-based nanomaterial composition may be any value between, and including, any of the minimum and maximum values noted above. It will be further appreciated that the carbon hybridization ratio $P_{sp3}/P_{sp2}$ of the carbon-based nanomaterial composition may be within a range between, and including, any of the minimum and maximum values noted above.

According to certain embodiments, the carbon-based nanomaterial may have particular carbon structures. For example, according to certain embodiments, the carbon-based nanomaterial may include carbon-based nanosheets. According to certain embodiments, the carbon-based nanomaterial may consist of carbon-based nanosheets. For purposes of embodiments described herein, a nanosheet may be defined as a two-dimensional allotropic form of carbon. According to still other embodiments, a nanosheet may have Sp2-hybridized carbon atoms, connected by sigma and pi bonds in a hexagonal lattice of polyaromatic rings.

According to certain embodiments, the carbon-based nanomaterial may include carbon-based nanoflakes. According to certain embodiments, the carbon-based nanomaterial may consist of carbon-based nanoflakes. For purposes of embodiments described herein, a nanoflake may be defined as a Lamellae of graphene, such as, a two-dimensional carbon sheet. According to still other embodiments, the nanoflakes may have two-dimensional carbon sheet size of between about 50 nm and 100 nm.

According to certain embodiments, the carbon-based nanomaterial may include carbon-based nanospheres. According to certain embodiments, the carbon-based nanomaterial may consist of carbon-based nanospheres. For purposes of embodiments described herein, a nanosphere may be defined as a Sp2-hybridized form of carbon with atomic carbon clusters formed into a spherical structure via covalent bonds. According to certain embodiments, the nanospheres can have a radii ranging from about 50 nm to about 250 nm.

According to certain embodiments, the carbon-based nanomaterial may include carbon-based nano-onions. According to certain embodiments, the carbon-based nanomaterial may consist of carbon-based nano-onions. For purposes of embodiments described herein, a nano-onion may be defined as a nanostructure that includes multiple concentric shells of hexagonal-latticed sheets, strained to form spherical structures. According to still other embodiments, the nano-onions may include layers folded over on themselves such that they resemble an onion shell, sometimes encompassing a small volume of amorphous carbon.

According to still other embodiments, the carbon-based nanomaterial may include carbon black. According to certain embodiments, the carbon-based nanomaterial may consist of carbon black. For purposes of embodiments described herein, carbon black may be defined as material that is spherical with radii below 1000 nm. According to still other embodiments, the carbon black may be amorphous and may be a black fine powder.

According to still other embodiments, the carbon-based nanomaterial may include turbostratic carbon. According to certain embodiments, the carbon-based nanomaterial may consist of turbostratic carbon. For purposes of embodiments described herein, turbostratic carbon may be defined as a material having a mixture of sp2- and sp3-hybridized carbon, where the sp2-hybridized planes are surrounded and connected by a sp3-hybridized amorphous matrix. The turbostratic carbon may include curved sheets of graphene-like carbon-polyaromatic structures, forming grape-like fractal aggregates of primary particles.

According to still other embodiments, the carbon-based nanomaterial may include any combination of carbon-based nanosheets, carbon-based nanoflakes, carbon-based nanospheres, carbon-based nano-onions, carbon black, or turbostratic carbon. According to still other embodiments, the carbon-based nanomaterial may consist of any combination of carbon-based nanosheets, carbon-based nanoflakes, carbon-based nanospheres, carbon-based nano-onions, carbon black, or turbostratic carbon.

Figure 2:
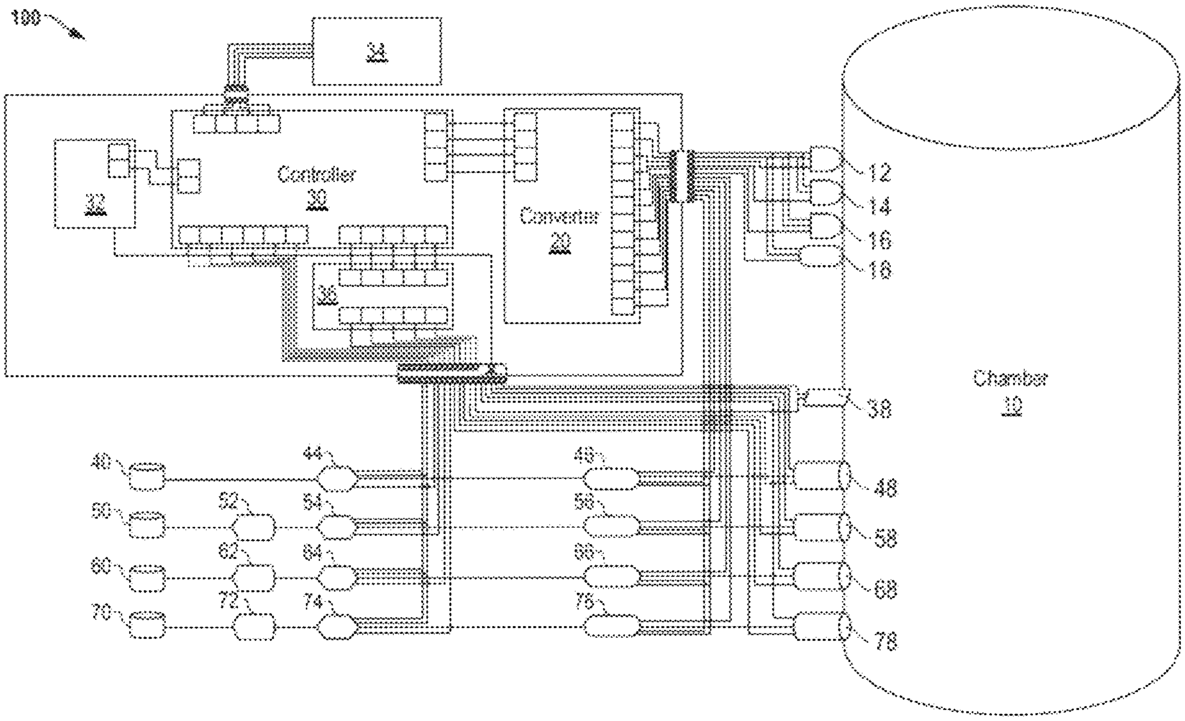
FIG. 2 includes a schematic diagram of a carbon capture system according to an embodiment of the present disclosure.

Turning now to a system for synthesis of carbon-based nanomaterial according to embodiments described herein, FIG. 2 includes a diagram of a carbon capture system according to embodiments described herein. As shown in FIG. 2, a carbon capture system 100 according to embodiments of the present disclosure includes a combustion chamber 10 for conversion of hydrocarbon gas or liquid into carbon-based nanomaterial. The system 100 may be scaled as needed and may be located onsite, for example, at a hydrocarbon drilling operation or other suitable hydrocarbon feedstock site. Advantageously, the apparatus and methods disclosed herein permit a wide range of hydrocarbons to be used as a feedstock thereby converting numerous types of carbon-containing fluids, such as industrial flue gas output, to generate a valuable product, e.g., carbon-based nanomaterial. Thus, the disclosure herein beneficially teaches to capture a variety of carbon in industrial outputs and minimize greenhouse gas emissions therefrom while providing a valuable product for further industrial processes, materials, and equipment, for example, carbon-based nanomaterial-coated proton electron membranes. The combustion chamber 10 of FIG. 2 may be a heavy-duty chamber with multiple injection ports for controlled injection of the hydrocarbon material and separate injection of oxygen and hydrogen that forces re-bonding of carbon, hydrogen, and oxygen when ignited to form carbon-based nanomaterial and other products that do not contribute to greenhouse gas emissions, such as water. Without being bound by theory, the use of controlled, separate injection of oxygen and hydrogen allows for a much faster combustion of the hydrocarbon material as compared with traditional oxidizing agents; this permits a more complete breakdown of the hydrocarbon material. The combustion chamber 10 may be formed of any suitable material, such as aluminum, titanium aluminum, nickel aluminum, cast iron, steel, and the like. In some embodiments, the combustion chamber 10 is configured to withstand at least 1000 psi of internal pressure.

The combustion chamber 10 may include one or more sensors configured to monitor and measure conditions within the combustion chamber 10. In some embodiments, the combustion chamber 10 includes a temperature sensor 18 configured to measure a temperature within the combustion chamber 10. In some embodiments, the combustion chamber 10 includes a low pressure sensor 16, a pressure sensor 14, and a high pressure sensor 12, each configured to measure a pressure within the combustion chamber 10. In one or more embodiments, the combustion chamber 10 may include an opacity sensor configured to measure an opacity within the combustion chamber 10. In some embodiments, the combustion chamber 10 may include a vacuum valve configured to create a vacuum within the combustion chamber 10 as a precursor to introducing any reactants (or inert gas). In some embodiments, the combustion chamber 10 includes a pressure release valve configured to release pressure from the combustion chamber 10. The pressure release valve may be actuated once a threshold pressure is reached within the combustion chamber 10 and/or on demand, for example, at a set time after each combustion within the combustion chamber 10.

The system includes an inert gas source 40, a flue gas source 50, an oxygen source 60, and a hydrogen source 70 each in fluidic communication with the combustion chamber 10. The inert gas source 40 is arranged to provide a supply of an inert gas, such as argon, under pressure to the combustion chamber 10, wherein said pressure may be monitored by a pressure sensor 44. The inert gas provides an inert environment for clean combustion within the combustion chamber 10. For instance, the inert environment may prevent or suppress formation of NOx (nitrogen oxides) that might otherwise occur. A flow meter 46 is provided between the inert gas source 40 and the combustion chamber 10 and the flow meter 46 is configured to measure a flow rate of inert gas from the inert gas source 40 into the combustion chamber 10. The inert gas is introduced into the combustion chamber 10 through an injection port 48, which may include a one-way valve in order to maintain pressure within the combustion chamber 10 and avoid flashback. In some embodiments, the one-way valve is a solenoid valve.

The flue gas source 50 supplies a carbon-based gas or liquid to the combustion chamber 10. Suitable carbon-based gases or liquids include a variety of commercial and industrial output products that include carbon, typically in a hydrocarbon, which include but are not limited to carbon dioxide, methane, propane, acetylene, butane, or combinations thereof. The carbon content of the carbon-based gases or liquids is not particularly limited. In some embodiments, the flue gas source 50 is an exhaust stream from an industrial reaction process, such as a coal energy plant, a drilling operation, a combustion engine, or a landfill. In other embodiments, the exhaust stream from said industrial reaction process may be collected and stored in a tank or other vessel that may be used later in the system 100. In some embodiments, the flue gas source 50 comprises a holding tank configured to receive and pressurize the exhaust stream from such an industrial process to provide a consistent feedstock pressure to the apparatus herein. In any embodiment, the flue gas source 50 may include a pressure sensor 54 in communication therewith configured to monitor a pressure of the carbon-based gas or liquid from the flue gas source 50. Between the flue gas source 50 and the combustion chamber 10 is a flow meter 56 configured to measure a flow rate of the carbon-based gas or liquid from the flue gas source 50 into the combustion chamber 10. The carbon-based gas or liquid is introduced into the combustion chamber 10 through an injection port 58, which may include a one-way valve in order to maintain pressure within the combustion chamber 10 and avoid flashback. In some embodiments, the one-way valve is a solenoid valve. In some embodiments, a flash arrester 52 may also be included between the flue gas source 50 and the combustion chamber 10, e.g., between the pressure sensor 54 and the flue gas source 50. The flash arrester 52 may include a sensor configured to detect flashback during the combustion process in the combustion chamber 10 and, in response, shut down the system 100 to minimize or avoid the risk of explosion or fire.

The oxygen source 60 supplies oxygen gas to the combustion chamber 10. In some embodiments, the oxygen source 60 is pressurized at about 50 psi or greater. In some embodiments, the oxygen source 60 receives oxygen from a proton exchange membrane (PEM) electrolyzer and, optionally, pressurizes the oxygen. In other embodiments, the oxygen source 60 comprises an oxygen cylinder. In any embodiment, the oxygen source 60 may include a pressure sensor 64 in communication therewith configured to monitor a pressure of the oxygen from the oxygen source 60. Between the oxygen source 60 and the combustion chamber 10 is a flow meter 66 configured to measure a flow rate of the oxygen from the oxygen source 60 into the combustion chamber 10. The oxygen is introduced into the combustion chamber 10 through an injection port 68, which may include a one-way valve in order to maintain pressure within the combustion chamber 10 and avoid flashback. In some embodiments, the one-way valve is a solenoid valve. In some embodiments, a flash arrester 62 may also be included between the oxygen source 60 and the combustion chamber 10, e.g., between the pressure sensor 64 and the oxygen source 60. The flash arrester 62 may include a sensor configured to detect flashback during the combustion process in the combustion chamber 10 and, in response, shut down the system 100.

The hydrogen source 70 supplies hydrogen gas to the combustion chamber 10. In some embodiments, the hydrogen source 70 is pressurized at about 50 psi or greater. In some embodiments, the hydrogen source 70 receives hydrogen from a proton exchange membrane (PEM) electrolyzer and, optionally, pressurizes the hydrogen. In other embodiments, the hydrogen source 70 comprises a hydrogen cylinder. In any embodiment, the hydrogen source 70 may include a pressure sensor 74 in communication therewith configured to monitor a pressure of the hydrogen from the hydrogen source 70. Between the hydrogen source 70 and the combustion chamber 10 is a flow meter 76 configured to measure a flow rate of the hydrogen from the hydrogen source 70 into the combustion chamber 10. The hydrogen is introduced into the combustion chamber 10 through an injection port 78, which may include a one-way valve in order to maintain pressure within the combustion chamber 10 and avoid flashback. In some embodiments, the one-way valve is a solenoid valve. In some embodiments, a flash arrester 72 may also be included between the hydrogen source 70 and the combustion chamber 10, e.g., between the pressure sensor 74 and the hydrogen source 70. The flash arrester 72 may include a sensor configured to detect flashback during the combustion process in the combustion chamber 10 and, in response, shut down the system 100.

The combustion chamber 10 includes an ignition device 38, such as a spark plug. The ignition device 38 is configured to initiate a series of precisely timed combustions. For example, each combustion event may last about a millisecond. The spacing between combustions and the duration of combustions may be appropriately adjusted based on the measured conditions of the system 100. In one or more embodiments, the ignition device 38 is positioned at a mid-point of the combustion chamber 10. According to this configuration, as particles of the reactants (flue gas, oxygen, and hydrogen) accelerate in each direction the particles hit at each end and assemble the carbon-based nanomaterial.

The system 100 also includes a controller 30 configured to receive inputs from the sensors within the system 100 and to control combustion conditions within the combustion chamber 10. In some embodiments, the controller 30 in configured to receive inputs from one or more of the flow meters 46, 56, 66, 76, the temperature sensor 18, the low pressure sensor 16, the pressure sensor 14, the high pressure sensor 12, and the pressure sensors 44, 54, 64, 74. In some embodiments, the controller 30 comprises a converter 20 configured to receive said inputs as analog signals and convert the analog signals into digital signals.

The controller 30 may also include a driver 36. In some embodiments, the driver 36 is configured to actuate one or more of the solenoid valves at injection ports 48, 58, 68, 78 and/or to actuate the ignition device 38. In some embodiments, the controller 30 may also include a power distributor 32 to distribute power throughout the system, for example, to the solenoid valves at injection ports 48, 58, 68, 78 and to the ignition device 38.

In one or more embodiments, the system 100 includes a user interface 34. The user interface 34 may display any one or more of the measurements from the sensors described above. In some embodiments, the user interface 34 may be configured to allow customization of the combustion conditions, such as flow rates, pressure, and temperature. The user interface 34 may allow for individual control of each parameter of the system 100 and/or may include pre-programmed functions.

In one or more embodiments, the combustion chamber 10 is maintained at about 100° F. or less before combustion, which helps build pressure once carbon-based nanomaterial is produced. After combustion, the temperature within the combustion chamber 10 may be around about 120° F. In some embodiments, a pressure within the combustion chamber 10 is maintained at about 5 to 20 psi prior to combustion. In some embodiments, a pressure within the combustion chamber 10 before combustion is about one half that of a pressure after combustion, for example to about 10 to 40 psi, to facilitate efficient conversion of the carbon-based flue gas into carbon-based nanomaterial production.

In some embodiments, the system 100 may be automated to achieve a cost-efficient carbon-based nanomaterial production method on- or off-site. The automated system 100 determines the mixture for each internal combustion in the chamber to produce carbon-based nanomaterial in real time. In other embodiments, through the use of the user interface 34, the system 100 may be manually controlled.

In any embodiment, the system 100 may be configured to measure, in real-time, the make-up of the carbon-based gas or liquid. Such a measurement may be, for example, derived from the measured temperature and pressure changes within the combustion chamber 10 during and after combustion. The ratios of the carbon-based gas or liquid, hydrogen, and oxygen may be precisely adjusted to achieve a consistent carbon-based nanomaterial product, to modify the conversion of carbon from the carbon-based feedstock into carbon-based nanomaterial to increase the yield thereof, or ideally, both. After each combustion, the system 100 makes small adjustments as needed to one or more parameters to improve the efficiency of carbon-based nanomaterial production. A number of combustions may be required to reach optimal combustion conditions for a given carbon-based gas or liquid. However, the precise control of each of the input reactants allows the system 100 to operate with a wide range of carbon sources—even with a variable carbon source.

Turning now to particular applications or uses of carbon-based nanomaterial formed according to embodiments described herein, the carbon-based nanomaterial may be used in various applications. For example, according to certain embodiments, the carbon-based nanomaterial may be used in the formation of concrete. According to particular embodiments, a concrete mixture may include carbon-based nanomaterial having any of the characteristics described herein. Without being tied to any particular theory, the carbon-based nanomaterial may improve structural performance of the concrete, such as reducing slump, increasing time to usable cure or reducing water demand. According to still other embodiments, the carbon-based nanomaterial may improve the thermal properties of the concrete.

According to still other embodiments, the carbon-based nanomaterial may be used in the formation of building materials, such as, bricks. According to certain embodiments, building materials may include carbon-based nanomaterial having any of the characteristics described herein. According to still other embodiments, bricks may include carbon-based nanomaterial having any of the characteristics described herein. Without being tied to any particular theory, the carbon-based nanomaterial may improve the conductivity of the building materials or bricks. According to still other embodiments, the carbon-based nanomaterial may improve the structural performance of the building materials or bricks. According to still other embodiments, the carbon-based nanomaterial may improve the thermal properties of the building materials or bricks.

According to yet other embodiments, the carbon-based nanomaterial may be used in the formation of oil. According to certain embodiments, oil may include carbon-based nanomaterial having any of the characteristics described herein. Without being tied to any particular theory, the carbon-based nanomaterial may improve the friction reduction properties of the oil. According to still other embodiments, the carbon-based nanomaterial may improve the thermal properties of the oil.

According to still other embodiments, the carbon-based nanomaterial may be used in the formation of filters. According to certain embodiments, filters may include carbon-based nanomaterial having any of the characteristics described herein. Without being tied to any particular theory, the carbon-based nanomaterial may improve the performance of the filters.

According to still other embodiments, the carbon-based nanomaterial may be used in radio frequency energy harvesting. Without being tied to any particular theory, the carbon-based nanomaterial may improve long distance energy transfer.

According to yet other embodiments, the carbon-based nanomaterial may be used in the formation of capacitors. According to certain embodiments, capacitors may include carbon-based nanomaterial having any of the characteristics described herein. Without being tied to any particular theory, the carbon-based nanomaterial may improve the energy density of the capacitors. According to still other embodiments, the carbon-based nanomaterial may improve the charge and discharge rate of the capacitors.

According to yet other embodiments, the carbon-based nanomaterial may be used in geothermal processes. Without being tied to any particular theory, the carbon-based nanomaterial may improve the thermal properties of geothermal processes.

According to yet other embodiments, the carbon-based nanomaterial may be used in the formation of paint, paint durability and paint adhesion. According to certain embodiments, paint may include carbon-based nanomaterial having any of the characteristics described herein. Without being tied to any particular theory, the carbon-based nanomaterial may improve the corrosion resistance of the paint. According to still other embodiments, the carbon-based nanomaterial may improve the thermal properties of the paint. According to yet other embodiments, the carbon-based nanomaterial may improve the color properties of the paint. According to yet other embodiments, the carbon-based nanomaterial may improve durability of the paint. According to other embodiments, the carbon-based nanomaterial may improve the adhesion of the paint.

According to yet other embodiments, the carbon-based nanomaterial may be used in the formation of coolant. According to certain embodiments, coolant may include carbon-based nanomaterial having any of the characteristics described herein. Without being tied to any particular theory, the carbon-based nanomaterial may improve the thermal properties of the coolant. According to yet other embodiments, the carbon-based nanomaterial may improve the flow of the coolant due to a reduction of friction.

According to yet other embodiments, the carbon-based nanomaterial may be used in the formation of metal. According to certain embodiments, metal may include carbon-based nanomaterial having any of the characteristics described herein. Without being tied to any particular theory, the carbon-based nanomaterial may improve the structural properties of the metal. According to still other embodiments, the carbon-based nanomaterial may improve the thermal properties of the metal. According to still other embodiments, the carbon-based nanomaterial may improve the corrosion properties of the metal. According to yet other embodiments, the carbon-based nanomaterial may improve the flexibility of the metal. According to yet other embodiments, the carbon-based nanomaterial may improve the durability of the metal.

According to yet other embodiments, the carbon-based nanomaterial may be used in the formation of tire additives. According to certain embodiments, tire additives may include carbon-based nanomaterial having any of the characteristics described herein. Without being tied to any particular theory, the carbon-based nanomaterial may improve the wear, color, thermal properties, or grip of tire additives.

According to yet other embodiments, the carbon-based nanomaterial may be used in the formation of various household or commercial countertops. According to certain embodiments, household or commercial countertops may include carbon-based nanomaterial having any of the characteristics described herein. Without being tied to any particular theory, the carbon-based nanomaterial may improve the strength of the household or commercial countertops. According to still other embodiments, the carbon-based nanomaterial may improve the scratch and wear resistance of the household or commercial countertops. According to yet other embodiments, the carbon-based nanomaterial may improve the thermal properties of the household or commercial countertops.

According to yet other embodiments, the carbon-based nanomaterial may be used in the formation of digital displays. According to certain embodiments, digital displays may include carbon-based nanomaterial having any of the characteristics described herein.

According to yet other embodiments, the carbon-based nanomaterial may be used in the formation of sunscreen. According to certain embodiments, sunscreen may include carbon-based nanomaterial having any of the characteristics described herein. Without being tied to any particular theory, the carbon-based nanomaterial may improve the thermal properties of the sunscreen.

According to yet other embodiments, the carbon-based nanomaterial may be used in the formation of soap or shampoo. According to certain embodiments, soap or shampoo may include carbon-based nanomaterial having any of the characteristics described herein. Without being tied to any particular theory, the carbon-based nanomaterial may improve the cleanability of the soap or shampoo.

According to yet other embodiments, the carbon-based nanomaterial may be used in the formation of non-stick or thermally conductive coating for pots and pans. According to certain embodiments, non-stick or thermally conductive coating for pots and pans may include carbon-based nanomaterial having any of the characteristics described herein. Without being tied to any particular theory, the carbon-based nanomaterial may improve the thermal properties of the non-stick or thermally conductive coating for pots and pans.

According to yet other embodiments, the carbon-based nanomaterial may be used in the formation of sunglasses. According to certain embodiments, sunglasses may include carbon-based nanomaterial having any of the characteristics described herein. Without being tied to any particular theory, the carbon-based nanomaterial may improve the thermal properties of the sunglasses. According to still other embodiments, the carbon-based nanomaterial may improve the UV absorption of the sunglasses.

According to yet other embodiments, the carbon-based nanomaterial may be used in the formation of Wi-Fi antennas. According to certain embodiments, Wi-Fi antennas may include carbon-based nanomaterial having any of the characteristics described herein. Without being tied to any particular theory, the carbon-based nanomaterial may improve the signal reception of Wi-Fi antennas.

According to yet other embodiments, the carbon-based nanomaterial may be used in the formation of textiles. According to certain embodiments, textiles may include carbon-based nanomaterial having any of the characteristics described herein.

According to yet other embodiments, the carbon-based nanomaterial may be used in the formation of glass. According to certain embodiments, glass may include carbon-based nanomaterial having any of the characteristics described herein. Without being tied to any particular theory, the carbon-based nanomaterial may improve the thermal properties of the glass. According to still other embodiments, the carbon-based nanomaterial may improve the structural properties of glass. According to yet other embodiments, the carbon-based nanomaterial may improve the color properties of glass.

According to yet other embodiments, the carbon-based nanomaterial may be used in the formation of solar panels. According to certain embodiments, solar panels may include carbon-based nanomaterial having any of the characteristics described herein. Without being tied to any particular theory, the carbon-based nanomaterial may improve the conductivity, light absorption, or strength of solar panels. According to still other embodiments, the carbon-based nanomaterial may improve the thermal properties of solar panels.

According to yet other embodiments, the carbon-based nanomaterial may be used in the formation of solar epoxy. According to certain embodiments, epoxy may include carbon-based nanomaterial having any of the characteristics described herein. Without being tied to any particular theory, the carbon-based nanomaterial may improve the tensile strength and performance of epoxy. According to still other embodiments, the carbon-based nanomaterial may improve the thermal properties of epoxy.

According to yet other embodiments, the carbon-based nanomaterial may be used in the formation of solar power windows. According to certain embodiments, solar power windows may include carbon-based nanomaterial having any of the characteristics described herein.

According to yet other embodiments, the carbon-based nanomaterial may be used in the formation of ceramic additives. According to certain embodiments, ceramic additives may include carbon-based nanomaterial having any of the characteristics described herein. Without being tied to any particular theory, the carbon-based nanomaterial may improve the thermal properties of the ceramic additives. According to still other embodiments, the carbon-based nanomaterial may improve the structural properties of ceramic additives. According to yet other embodiments, the carbon-based nanomaterial may improve the color properties of ceramic additives.

According to yet other embodiments, the carbon-based nanomaterial may be used in the formation of biomedical implants. According to certain embodiments, biomedical implants may include carbon-based nanomaterial having any of the characteristics described herein.

According to yet other embodiments, the carbon-based nanomaterial may be used in the paper and pulp industry.

According to yet other embodiments, the carbon-based nanomaterial may be used in the formation of reversible hydrogen storage materials.

According to yet other embodiments, the carbon-based nanomaterial may be used in the formation of polishing compound additives.

According to yet other embodiments, the carbon-based nanomaterial may be used in the sports industry.

According to yet other embodiments, the carbon-based nanomaterial may be used in the formation of weather stripping.

According to yet other embodiments, the carbon-based nanomaterial may be used in the formation of lightweight personnel armor that is light and more resilient bulletproof clothing.

According to yet other embodiments, the carbon-based nanomaterial may be used in the formation of carbon hex, which may provide structural integrity for other materials.

According to yet other embodiments, the carbon-based nanomaterial may be used in the formation of grease. According to certain embodiments, grease may include carbon-based nanomaterial having any of the characteristics described herein. Without being tied to any particular theory, the carbon-based nanomaterial may improve the thermal properties of the grease. According to still other embodiments, the carbon-based nanomaterial may improve the lubrication of grease. According to yet other embodiments, the carbon-based nanomaterial may improve the color properties of grease.

According to yet other embodiments, the carbon-based nanomaterial may be used in the formation of adhesives. According to certain embodiments, adhesives may include carbon-based nanomaterial having any of the characteristics described herein. Without being tied to any particular theory, the carbon-based nanomaterial may improve the surface area of the adhesives. According to still other embodiments, the carbon-based nanomaterial may improve the thermal properties of the adhesives.

According to still other embodiments, the carbon-based nanomaterial may be used in the formation of roofing materials, such as, shingles, tar coatings, metal roofing materials. According to certain embodiments, roofing materials may include carbon-based nanomaterial having any of the characteristics described herein. According to still other embodiments, the carbon-based nanomaterial may improve the structural performance of the roofing materials. According to still other embodiments, the carbon-based nanomaterial may improve the thermal properties of the roofing materials.

According to still other embodiments, the carbon-based nanomaterial may be used in the formation of soil. According to certain embodiments, soil may include carbon-based nanomaterial having any of the characteristics described herein. According to still other embodiments, the carbon-based nanomaterial may improve soil stabilization (anti-hydro faction) and soil amendment (nutrients).

According to yet other embodiments, the carbon-based nanomaterial may be used in the formation of fire extinguishers or fire retardants, such as blankets.

According to yet other embodiments, the carbon-based nanomaterial may be used in the formation of batteries.

According to yet other embodiments, the carbon-based nanomaterial may be used in the formation of fuel cell catalysts.

According to yet other embodiments, the carbon-based nanomaterial may be used in the formation of or operation of nuclear power plants.

According to yet other embodiments, the carbon-based nanomaterial may be used in alcohol distillation or water purification.

According to yet other embodiments, the carbon-based nanomaterial may be used in the formation of drug delivery systems.

According to yet other embodiments, the carbon-based nanomaterial may be used in the formation of cancer treatments.

According to yet other embodiments, the carbon-based nanomaterial may be used in the formation of gene delivery.

According to yet other embodiments, the carbon-based nanomaterial may be used in diabetes monitoring.

According to yet other embodiments, the carbon-based nanomaterial may be used in the formation of biosensors.

According to yet other embodiments, the carbon-based nanomaterial may be used in the formation of light generators.

According to yet other embodiments, the carbon-based nanomaterial may be used in the formation of transistors.

According to yet other embodiments, the carbon-based nanomaterial may be used in the formation of waterproofing materials.

According to yet other embodiments, the carbon-based nanomaterial may be used in the formation of wearable proofing.

According to yet other embodiments, the carbon-based nanomaterial may be used in the formation of wearable electronics.

According to yet other embodiments, the carbon-based nanomaterial may be used in the formation of touch screens.

According to yet other embodiments, the carbon-based nanomaterial may be used in the formation of flexible screens.

According to yet other embodiments, the carbon-based nanomaterial may be used in the formation of food packaging.

According to yet other embodiments, the carbon-based nanomaterial may be used in desalination processes.

According to yet other embodiments, the carbon-based nanomaterial may be used in the formation or in combination with gasoline. According to certain embodiments, gasoline may include carbon-based nanomaterial having any of the characteristics described herein.

According to yet other embodiments, the carbon-based nanomaterial may be used in the formation or in combination with ethanol or ethanol based fuels. According to certain embodiments, ethanol or ethanol based fuels may include carbon-based nanomaterial having any of the characteristics described herein.

According to yet other embodiments, the carbon-based nanomaterial may be used in the formation or in combination with cancer targeting materials, such as peptides, or other known proteins. According to certain embodiments, cancer targeting materials may include carbon-based nanomaterial having any of the characteristics described herein.

According to yet other embodiments, the carbon-based nanomaterial may be used in the formation or in combination with medical drug delivery systems, in particular, nano-drug delivery systems. According to certain embodiments, drug delivery systems may include carbon-based nanomaterial having any of the characteristics described herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A carbon-based nanomaterial composition formed from a gas mixture, wherein the gas mixture comprises: acetylene gas at a molar ratio $AG_{mol}/GM_{mol}$ of at least about 0.25 and not greater than about 0.99, where the $AG_{mol}$ is equal to the moles of acetylene gas in the gas mixture and $GM_{mol}$ is equal to the total moles of gas in the gas mixture, oxygen gas at a molar ratio $OG_{mol}/GM_{mol}$ of at least about 0.01 and not greater than about 0.55, where the $OG_{mol}$ is equal to the moles of oxygen gas in the gas mixture and $GM_{mol}$ is equal to the total moles of gas in the gas mixture, hydrogen gas at a molar ratio $HG_{mol}/GM_{mol}$ of at least about 0.05 and not greater than about 0.75, where the $HG_{mol}$ is equal to the moles of hydrogen gas in the gas mixture and $GM_{mol}$ is equal to the total moles of gas in the gas mixture, and methane gas at a molar ratio $MG_{mol}/GM_{mol}$ of at least about 0.25 and not greater than about 0.99, where the $MG_{mol}$ is equal to the moles of methane gas in the gas mixture and $GM_{mol}$ is equal to the total moles of gas in the gas mixture, wherein the carbon-based nanomaterial has a carbon hybridization ratio $P_{sp3}/P_{sp2}$ of at least about 0.0 and not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 2. A method of forming a carbon-based nanomaterial composition, wherein the method comprises: supplying a gas mixture comprising: acetylene gas at a molar ratio $AG_{mol}/GM_{mol}$ of at least about 0.25 and not greater than about 0.99, where the $AG_{mol}$ is equal to the moles of acetylene gas in the gas mixture and $GM_{mol}$ is equal to the total moles of gas in the gas mixture, oxygen gas at a molar ratio $OG_{mol}/GM_{mol}$ of at least about 0.01 and not greater than about 0.55, where the $OG_{mol}$ is equal to the moles of oxygen gas in the gas mixture and $GM_{mol}$ is equal to the total moles of gas in the gas mixture, hydrogen gas at a molar ratio $HG_{mol}/GM_{mol}$ of at least about 0.05 and not greater than about 0.75, where the $HG_{mol}$ is equal to the moles of hydrogen gas in the gas mixture and $GM_{mol}$ is equal to the total moles of gas in the gas mixture, and methane gas at a molar ratio $MG_{mol}/GM_{mol}$ of at least about 0.25 and not greater than about 0.99, where the $MG_{mol}$ is equal to the moles of methane gas in the gas mixture and $GM_{mol}$ is equal to the total moles of gas in the gas mixture, igniting the gas mixture to form the carbon-based nanomaterial composition, wherein the carbon-based nanomaterial has a carbon hybridization ratio $P_{sp3}/P_{sp2}$ of at least about 0.0 and not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 3. A carbon-based nanomaterial composition comprising: a carbon content of at least about 75% and not greater than about 100% based on elemental analysis of the carbon-based nanomaterial composition, and an oxygen content of at least about 0.0% and not greater than about 25.0% based on elemental analysis of the carbon-based nanomaterial composition, wherein the carbon-based nanomaterial composition comprises a D/G ratio of at least about 0.1 and not greater than about 2.0; and wherein the carbon-based nanomaterial has a carbon hybridization ratio $P_{sp3}/P_{sp2}$ of at least about 0.0 and not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 4. A carbon-based nanomaterial composition comprising: a carbon content of at least about 75% and not greater than about 100% based on elemental analysis of the carbon-based nanomaterial composition, and an oxygen content of at least about 0.0% and not greater than about 25.0% based on elemental analysis of the carbon-based nanomaterial composition, wherein the carbon-based nanomaterial composition comprises an aspect ratio at least about 1 and not greater than about 50; wherein the carbon-based nanomaterial has a carbon hybridization ratio $P_{sp3}/P_{sp2}$ of at least about 0.0 and not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 5. The carbon-based nanomaterial composition or method of any one of embodiments 1, 2, 3, and 4, wherein the carbon-based nanomaterial composition comprises a carbon content of at least about 75% based on elemental analysis of the carbon-based nanomaterial composition.

Embodiment 6. The carbon-based nanomaterial composition or method of any one of embodiments 1, 2, 3, and 4, wherein the carbon-based nanomaterial composition comprises a carbon content of not greater than about 100% based on elemental analysis of the carbon-based nanomaterial composition.

Embodiment 7. The carbon-based nanomaterial composition or method of any one of embodiments 1, 2, 3, and 4, wherein the carbon-based nanomaterial composition comprises an oxygen content of at least about 0.0% based on elemental analysis of the carbon-based nanomaterial composition.

Embodiment 8. The carbon-based nanomaterial composition or method of any one of embodiments 1, 2, 3, and 4, wherein the carbon-based nanomaterial composition comprises an oxygen content of not greater than about 25.0% based on elemental analysis of the carbon-based nanomaterial composition.

Embodiment 9. The carbon-based nanomaterial composition or method of any one of embodiments 1, 2, 3, and 4, wherein the carbon-based nanomaterial composition comprises a carbon hybridization ratio $P_{sp3}/P_{sp2}$ of at least about 0.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 10. The carbon-based nanomaterial composition or method of any one of embodiments 1, 2, 3, and 4, wherein the carbon-based nanomaterial has a carbon hybridization ratio $P_{sp3}/P_{sp2}$ of not greater than about 5.0, where $P_{sp3}$ is the percent of carbon within the carbon-based nanomaterial composition having a sp3 hybridization and $P_{sp2}$ is the percent of carbon within the carbon-based nanomaterial composition having a sp2 hybridization.

Embodiment 11. The carbon-based nanomaterial composition or method of any one of embodiments 1, 2, 3, and 4, wherein the carbon-based nanomaterial composition comprises a D/G ratio of not greater than about 0.1.

Embodiment 12. The carbon-based nanomaterial composition or method of any one of embodiments 1, 2, 3, and 4, wherein the carbon-based nanomaterial composition comprises a D/G ratio of at least about 2.0.

Embodiment 13. The carbon-based nanomaterial composition or method of any one of embodiments 1, 2, 3, and 4, wherein the carbon-based nanomaterial composition comprises an aspect ratio of not greater than about 50.

Embodiment 14. The carbon-based nanomaterial composition or method of any one of embodiments 1, 2, 3, and 4, wherein the carbon-based nanomaterial composition comprises an aspect ratio of at least about 1.

Embodiment 15. The carbon-based nanomaterial composition of any one of embodiments 3 and 4, wherein the carbon-based nanomaterial composition is formed from a gas mixture.

Embodiment 16. The carbon-based nanomaterial composition or method of any one of embodiments 1, 2, and 15, wherein the gas mixture comprises acetylene gas at a concentration of at least about 1.2 mol.

Embodiment 17. The carbon-based nanomaterial composition or method of any one of embodiments 1, 2, and 15, wherein the gas mixture comprises acetylene gas at a concentration of not greater than about 12.0 mol.

Embodiment 18. The carbon-based nanomaterial composition or method of any one of embodiments 1, 2, and 15, wherein the gas mixture comprises oxygen gas at a concentration of at least about 0.3 mol.

Embodiment 19. The carbon-based nanomaterial composition or method of any one of embodiments 1, 2, and 15, wherein the gas mixture comprises oxygen gas at a concentration of not greater than about 2.5 mol.

Embodiment 20. The carbon-based nanomaterial composition or method of any one of embodiments 1, 2, and 15, wherein the gas mixture comprises hydrogen gas at a concentration of at least about 0.6 mol.

Embodiment 21. The carbon-based nanomaterial composition or method of any one of embodiments 1, 2, and 15, wherein the gas mixture comprises hydrogen gas at a concentration of not greater than about 5.0 mol.

Embodiment 22. The carbon-based nanomaterial composition or method of any one of embodiments 1, 2, and 15, wherein the gas mixture comprises methane gas at a concentration of at least about 1.2 mol.

Embodiment 23. The carbon-based nanomaterial composition or method of any one of embodiments 1, 2, and 15, wherein the gas mixture comprises methane gas at a concentration of not greater than about 12.0 mol.

Embodiment 24. The carbon-based nanomaterial composition or method of any one of embodiments 1, 2, 3, and 4, wherein the carbon-based nanomaterial composition is formed in a system for carbon-based nanomaterial synthesis, wherein the system comprises: an enclosed chamber comprising a hollow interior; a carbon-based gas source fluidically coupled to the chamber and configured to supply a carbon-based gas to the hollow interior; a hydrogen source that is independent of the carbon-based gas source and that is fluidically coupled to the chamber and configured to supply hydrogen to the hollow interior; an oxygen source that is independent of the carbon-based gas source and that is fluidically coupled to the chamber and configured to supply oxygen to the hollow interior; an igniter configured to ignite the carbon-based gas, hydrogen, and oxygen in the hollow interior; a first flow meter coupled to the carbon-based gas source, a second flow meter coupled to the hydrogen source, a third flow meter coupled to the oxygen source; and a controller in communication with and configured to receive flow data from the first, second, and third flow meters; wherein the controller is configured to adjust flow from one or more of the carbon-based gas source, the hydrogen source, and/or the oxygen source in response to the flow data.

Embodiment 25. The carbon-based nanomaterial composition or method of embodiment 24, wherein the carbon-based gas is a flue gas resulting from an industrial reaction process.

Embodiment 26. The carbon-based nanomaterial composition or method of embodiment 25, wherein the industrial reaction process is a coal energy plant, a drilling operation, a combustion engine, or a landfill.

Embodiment 27. The carbon-based nanomaterial composition or method of embodiment 25, wherein the carbon-based gas source comprises a storage tank, an inlet line, and an outlet line; wherein the storage tank is coupled to the chamber via the outlet line; and wherein the flue gas is directed from the industrial reaction process through the inlet line to the storage tank.

Embodiment 28. The carbon-based nanomaterial composition or method of embodiment 25, wherein the chamber is co-located with the industrial reaction process.

Embodiment 29. The carbon-based nanomaterial composition or method of embodiment 24, further comprising an inert gas source fluidically coupled to the chamber and configured to supply an inert gas to the hollow interior.

Embodiment 30. The carbon-based nanomaterial composition or method of embodiment 24, wherein the carbon-based gas source is coupled to the chamber via a first one-way valve, the hydrogen source is coupled to the chamber via a second one-way valve, and the oxygen source is coupled to the chamber via a third one-way valve.

Embodiment 31. The carbon-based nanomaterial composition or method of embodiment 30, wherein the chamber further comprises an exhaust valve.

Embodiment 32. The carbon-based nanomaterial composition or method of embodiment 24, further comprising a pressure sensor configured to measure a pressure within the hollow interior and a temperature sensor configured to measure a temperature within the hollow interior; wherein the controller is in communication with and configured to receive pressure data from the pressure sensor; wherein the controller is in communication with and configured to receive temperature data from the temperature sensor; and wherein the controller is configured to adjust flow from one or more of the carbon-based gas source, the hydrogen source, and the oxygen source in response to the flow data, the pressure data, the temperature data, or a combination thereof.

Embodiment 33. The carbon-based nanomaterial composition or method of any one of embodiments 1, 2, 3, and 4, wherein the carbon-based nanomaterial is used in the formation of building materials, such as, bricks.

Embodiment 34. The carbon-based nanomaterial composition or method of any one of embodiments 1, 2, 3, and 4, wherein a building material comprises the carbon-based nanomaterial.

Embodiment 35. The carbon-based nanomaterial composition or method of any one of embodiments 1, 2, 3, and 4, wherein the carbon-based nanomaterial is used in the formation of oil.

Embodiment 36. The carbon-based nanomaterial composition or method of any one of embodiments 1, 2, 3, and 4, wherein an oil comprises the carbon-based nanomaterial.

Embodiment 37. The carbon-based nanomaterial composition or method of any one of embodiments 1, 2, 3, and 4, wherein the carbon-based nanomaterial is used in the formation of filters.

Embodiment 38. The carbon-based nanomaterial composition or method of any one of embodiments 1, 2, 3, and 4, wherein a filter comprises the carbon-based nanomaterial.

Embodiment 39. The carbon-based nanomaterial composition or method of any one of embodiments 1, 2, 3, and 4, wherein the carbon-based nanomaterial is used in radio frequency energy harvesting.

Embodiment 40. The carbon-based nanomaterial composition or method of any one of embodiments 1, 2, 3, and 4, wherein the carbon-based nanomaterial is used in the formation of capacitors.

Embodiment 41. The carbon-based nanomaterial composition or method of any one of embodiments 1, 2, 3, and 4, wherein a capacitor comprises the carbon-based nanomaterial.

Embodiment 42. The carbon-based nanomaterial composition or method of any one of embodiments 1, 2, 3, and 4, wherein the carbon-based nanomaterial is used in the formation of paint, paint durability and paint adhesion.

Embodiment 43. The carbon-based nanomaterial composition or method of any one of embodiments 1, 2, 3, and 4, wherein a paint comprises the carbon-based nanomaterial.

Embodiment 44. The carbon-based nanomaterial composition or method of any one of embodiments 1, 2, 3, and 4, wherein the carbon-based nanomaterial is used in the formation of coolant.

Embodiment 45. The carbon-based nanomaterial composition or method of any one of embodiments 1, 2, 3, and 4, wherein a coolant comprises the carbon-based nanomaterial.

Embodiment 46. The carbon-based nanomaterial composition or method of any one of embodiments 1, 2, 3, and 4, wherein the carbon-based nanomaterial is used in the formation of metal.

Embodiment 47. The carbon-based nanomaterial composition or method of any one of embodiments 1, 2, 3, and 4, wherein a metal comprises the carbon-based nanomaterial.

Embodiment 48. The carbon-based nanomaterial composition or method of any one of embodiments 1, 2, 3, and 4, wherein the carbon-based nanomaterial is used in the formation of tire additives.

Embodiment 49. The carbon-based nanomaterial composition or method of any one of embodiments 1, 2, 3, and 4, wherein tire additives comprise the carbon-based nanomaterial.

Embodiment 50. The carbon-based nanomaterial composition or method of any one of embodiments 1, 2, 3, and 4, wherein the carbon-based nanomaterial is used in the formation of household or commercial countertops.

Embodiment 51. The carbon-based nanomaterial composition or method of any one of embodiments 1, 2, 3, and 4, wherein a household or commercial countertop comprises the carbon-based nanomaterial.

Embodiment 52. The carbon-based nanomaterial composition or method of any one of embodiments 1, 2, 3, and 4, wherein the carbon-based nanomaterial is used in the formation of digital displays.

Embodiment 53. The carbon-based nanomaterial composition or method of any one of embodiments 1, 2, 3, and 4, wherein a digital display comprises the carbon-based nanomaterial.

Embodiment 54. The carbon-based nanomaterial composition or method of any one of embodiments 1, 2, 3, and 4, wherein the carbon-based nanomaterial is used in the formation of sunscreen.

Embodiment 55. The carbon-based nanomaterial composition or method of any one of embodiments 1, 2, 3, and 4, wherein a sunscreen comprises the carbon-based nanomaterial.

Embodiment 56. The carbon-based nanomaterial composition or method of any one of embodiments 1, 2, 3, and 4, wherein the carbon-based nanomaterial is used in the formation of soap or shampoo.

Embodiment 57. The carbon-based nanomaterial composition or method of any one of embodiments 1, 2, 3, and 4, wherein a soap or shampoo comprises the carbon-based nanomaterial.

Embodiment 58. The carbon-based nanomaterial composition or method of any one of embodiments 1, 2, 3, and 4, wherein the carbon-based nanomaterial is used in the formation of non-stick or thermally conductive coating for pots and pans.

Embodiment 59. The carbon-based nanomaterial composition or method of any one of embodiments 1, 2, 3, and 4, wherein a non-stick or thermally conductive coating comprises the carbon-based nanomaterial.

Embodiment 60. The carbon-based nanomaterial composition or method of any one of embodiments 1, 2, 3, and 4, wherein the carbon-based nanomaterial is used in the formation of sunglasses.

Embodiment 61. The carbon-based nanomaterial composition or method of any one of embodiments 1, 2, 3, and 4, wherein sunglasses comprise the carbon-based nanomaterial.

Embodiment 62. The carbon-based nanomaterial composition or method of any one of embodiments 1, 2, 3, and 4, wherein the carbon-based nanomaterial is used in the formation of Wi-Fi antennas.

Embodiment 63. The carbon-based nanomaterial composition or method of any one of embodiments 1, 2, 3, and 4, wherein a Wi-Fi antenna comprises the carbon-based nanomaterial.

Embodiment 64. The carbon-based nanomaterial composition or method of any one of embodiments 1, 2, 3, and 4, wherein the carbon-based nanomaterial is used in the formation of textiles.

Embodiment 65. The carbon-based nanomaterial composition or method of any one of embodiments 1, 2, 3, and 4, wherein a textile comprises the carbon-based nanomaterial.

Embodiment 66. The carbon-based nanomaterial composition or method of any one of embodiments 1, 2, 3, and 4, wherein the carbon-based nanomaterial is used in the formation of glass.

Embodiment 67. The carbon-based nanomaterial composition or method of any one of embodiments 1, 2, 3, and 4, wherein a glass comprises the carbon-based nanomaterial.

Embodiment 68. The carbon-based nanomaterial composition or method of any one of embodiments 1, 2, 3, and 4, wherein the carbon-based nanomaterial is used in the formation of solar panels.

Embodiment 69. The carbon-based nanomaterial composition or method of any one of embodiments 1, 2, 3, and 4, wherein a solar panel comprises the carbon-based nanomaterial.

Embodiment 70. The carbon-based nanomaterial composition or method of any one of embodiments 1, 2, 3, and 4, wherein the carbon-based nanomaterial is used in the formation of solar epoxy.

Embodiment 71. The carbon-based nanomaterial composition or method of any one of embodiments 1, 2, 3, and 4, wherein an epoxy comprises the carbon-based nanomaterial.

Embodiment 72. The carbon-based nanomaterial composition or method of any one of embodiments 1, 2, 3, and 4, wherein the carbon-based nanomaterial is used in the formation of solar power windows.

Embodiment 73. The carbon-based nanomaterial composition or method of any one of embodiments 1, 2, 3, and 4, wherein a solar power window comprises the carbon-based nanomaterial.

Embodiment 74. The carbon-based nanomaterial composition or method of any one of embodiments 1, 2, 3, and 4, wherein the carbon-based nanomaterial is used in the formation of ceramic additives.

Embodiment 75. The carbon-based nanomaterial composition or method of any one of embodiments 1, 2, 3, and 4, wherein a ceramic additive comprises the carbon-based nanomaterial.

Embodiment 76. The carbon-based nanomaterial composition or method of any one of embodiments 1, 2, 3, and 4, wherein the carbon-based nanomaterial is used in the formation of biomedical implants.

Embodiment 77. The carbon-based nanomaterial composition or method of any one of embodiments 1, 2, 3, and 4, wherein a biomedical implant comprises the carbon-based nanomaterial.

Embodiment 78. The carbon-based nanomaterial composition or method of any one of embodiments 1, 2, 3, and 4, wherein the carbon-based nanomaterial is used in the paper and pulp industry.

Embodiment 79. The carbon-based nanomaterial composition or method of any one of embodiments 1, 2, 3, and 4, wherein the carbon-based nanomaterial is used in the formation of reversible hydrogen storage materials.

Embodiment 80. The carbon-based nanomaterial composition or method of any one of embodiments 1, 2, 3, and 4, wherein a hydrogen storage material comprises the carbon-based nanomaterial.

Embodiment 81. The carbon-based nanomaterial composition or method of any one of embodiments 1, 2, 3, and 4, wherein the carbon-based nanomaterial is used in the formation of polishing compound additives.

Embodiment 82. The carbon-based nanomaterial composition or method of any one of embodiments 1, 2, 3, and 4, wherein a polishing compound comprises the carbon-based nanomaterial.

Embodiment 83. The carbon-based nanomaterial composition or method of any one of embodiments 1, 2, 3, and 4, wherein the carbon-based nanomaterial is used in the sports industry.

Embodiment 84. The carbon-based nanomaterial composition or method of any one of embodiments 1, 2, 3, and 4, wherein the carbon-based nanomaterial is used in the formation of weather stripping.

Embodiment 85. The carbon-based nanomaterial composition or method of any one of embodiments 1, 2, 3, and 4, wherein weather stripping comprises the carbon-based nanomaterial.

Embodiment 86. The carbon-based nanomaterial composition or method of any one of embodiments 1, 2, 3, and 4, wherein the carbon-based nanomaterial is used in the formation of lightweight personnel armor that is light and more resilient bulletproof clothing.

Embodiment 87. The carbon-based nanomaterial composition or method of any one of embodiments 1, 2, 3, and 4, wherein a lightweight personnel armor or bulletproof clothing comprises the carbon-based nanomaterial.

Embodiment 88. The carbon-based nanomaterial composition or method of any one of embodiments 1, 2, 3, and 4, wherein the carbon-based nanomaterial is used in the formation of carbon hex, which may provide structural integrity for other materials.

Embodiment 89. The carbon-based nanomaterial composition or method of any one of embodiments 1, 2, 3, and 4, wherein a carbon hex comprises the carbon-based nanomaterial.

Embodiment 90. The carbon-based nanomaterial composition or method of any one of embodiments 1, 2, 3, and 4, wherein the carbon-based nanomaterial is used in the formation of grease.

Embodiment 91. The carbon-based nanomaterial composition or method of any one of embodiments 1, 2, 3, and 4, wherein a grease comprises the carbon-based nanomaterial.

Embodiment 92. The carbon-based nanomaterial composition or method of any one of embodiments 1, 2, 3, and 4, wherein the carbon-based nanomaterial is used in the formation of adhesives.

Embodiment 93. The carbon-based nanomaterial composition or method of any one of embodiments 1, 2, 3, and 4, wherein an additive comprises the carbon-based nanomaterial.

Embodiment 94. The carbon-based nanomaterial composition or method of any one of embodiments 1, 2, 3, and 4, wherein the carbon-based nanomaterial is used in the formation of roofing materials, such as, shingles, tar coatings, metal roofing materials.

Embodiment 95. The carbon-based nanomaterial composition or method of any one of embodiments 1, 2, 3, and 4, wherein a roofing material comprises the carbon-based nanomaterial.

Embodiment 96. The carbon-based nanomaterial composition or method of any one of embodiments 1, 2, 3, and 4, wherein the carbon-based nanomaterial is used in the formation of soil.

Embodiment 97. The carbon-based nanomaterial composition or method of any one of embodiments 1, 2, 3, and 4, wherein a soil comprises the carbon-based nanomaterial.

Embodiment 98. The carbon-based nanomaterial composition or method of any one of embodiments 1, 2, 3, and 4, wherein the carbon-based nanomaterial is used in the formation of fire extinguishers or fire retardants, such as blankets.

Embodiment 99. The carbon-based nanomaterial composition or method of any one of embodiments 1, 2, 3, and 4, wherein a fire extinguisher or fire retardant comprises the carbon-based nanomaterial.

Embodiment 100. The carbon-based nanomaterial composition or method of any one of embodiments 1, 2, 3, and 4, wherein the carbon-based nanomaterial is used in the formation of batteries.

Embodiment 101. The carbon-based nanomaterial composition or method of any one of embodiments 1, 2, 3, and 4, wherein a battery comprises the carbon-based nanomaterial.

Embodiment 102. The carbon-based nanomaterial composition or method of any one of embodiments 1, 2, 3, and 4, wherein the carbon-based nanomaterial is used in the formation of fuel cell catalysts.

Embodiment 103. The carbon-based nanomaterial composition or method of any one of embodiments 1, 2, 3, and 4, wherein a fuel cell catalyst comprises the carbon-based nanomaterial.

Embodiment 104. The carbon-based nanomaterial composition or method of any one of embodiments 1, 2, 3, and 4, wherein the carbon-based nanomaterial is used in the formation of or operation of nuclear power plants.

Embodiment 105. The carbon-based nanomaterial composition or method of any one of embodiments 1, 2, 3, and 4, wherein a nuclear power plant comprises the carbon-based nanomaterial.

Embodiment 106. The carbon-based nanomaterial composition or method of any one of embodiments 1, 2, 3, and 4, wherein the carbon-based nanomaterial is used in alcohol distillation or water purification.

Embodiment 107. The carbon-based nanomaterial composition or method of any one of embodiments 1, 2, 3, and 4, wherein the carbon-based nanomaterial is used in the formation of drug delivery systems.

Embodiment 108. The carbon-based nanomaterial composition or method of any one of embodiments 1, 2, 3, and 4, wherein a drug delivery system comprises the carbon-based nanomaterial.

Embodiment 109. The carbon-based nanomaterial composition or method of any one of embodiments 1, 2, 3, and 4, wherein the carbon-based nanomaterial is used in the formation of cancer treatments.

Embodiment 110. The carbon-based nanomaterial composition or method of any one of embodiments 1, 2, 3, and 4, wherein a cancer treatment comprises the carbon-based nanomaterial.

Embodiment 111. The carbon-based nanomaterial composition or method of any one of embodiments 1, 2, 3, and 4, wherein the carbon-based nanomaterial is used in the formation of gene delivery system.

Embodiment 112. The carbon-based nanomaterial composition or method of any one of embodiments 1, 2, 3, and 4, wherein a gene delivery system comprises the carbon-based nanomaterial.

Embodiment 113. The carbon-based nanomaterial composition or method of any one of embodiments 1, 2, 3, and 4, wherein the carbon-based nanomaterial is used in diabetes monitoring.

Embodiment 114. The carbon-based nanomaterial composition or method of any one of embodiments 1, 2, 3, and 4, wherein the carbon-based nanomaterial is used in the formation of biosensors.

Embodiment 115. The carbon-based nanomaterial composition or method of any one of embodiments 1, 2, 3, and 4, wherein a biosensor comprises the carbon-based nanomaterial.

Embodiment 116. The carbon-based nanomaterial composition or method of any one of embodiments 1, 2, 3, and 4, wherein the carbon-based nanomaterial is used in the formation of light generators.

Embodiment 117. The carbon-based nanomaterial composition or method of any one of embodiments 1, 2, 3, and 4, wherein a light generator comprises the carbon-based nanomaterial.

Embodiment 118. The carbon-based nanomaterial composition or method of any one of embodiments 1, 2, 3, and 4, wherein the carbon-based nanomaterial is used in the formation of transistors.

Embodiment 119. The carbon-based nanomaterial composition or method of any one of embodiments 1, 2, 3, and 4, wherein a transistor comprises the carbon-based nanomaterial.

Embodiment 120. The carbon-based nanomaterial composition or method of any one of embodiments 1, 2, 3, and 4, wherein the carbon-based nanomaterial is used in the formation of waterproofing materials.

Embodiment 121. The carbon-based nanomaterial composition or method of any one of embodiments 1, 2, 3, and 4, wherein a waterproofing material comprises the carbon-based nanomaterial.

Embodiment 122. The carbon-based nanomaterial composition or method of any one of embodiments 1, 2, 3, and 4, wherein the carbon-based nanomaterial is used in the formation of wearable electronic components.

Embodiment 123. The carbon-based nanomaterial composition or method of any one of embodiments 1, 2, 3, and 4, wherein a wearable electronic component comprises the carbon-based nanomaterial.

Embodiment 124. The carbon-based nanomaterial composition or method of any one of embodiments 1, 2, 3, and 4, wherein the carbon-based nanomaterial is used in the formation of touch screens.

Embodiment 125. The carbon-based nanomaterial composition or method of any one of embodiments 1, 2, 3, and 4, wherein a touch screen comprises the carbon-based nanomaterial.

Embodiment 126. The carbon-based nanomaterial composition or method of any one of embodiments 1, 2, 3, and 4, wherein the carbon-based nanomaterial is used in the formation of flexible screens.

Embodiment 127. The carbon-based nanomaterial composition or method of any one of embodiments 1, 2, 3, and 4, wherein a flexible screen comprises the carbon-based nanomaterial.

Embodiment 128. The carbon-based nanomaterial composition or method of any one of embodiments 1, 2, 3, and 4, wherein the carbon-based nanomaterial is used in the formation of food packaging.

Embodiment 129. The carbon-based nanomaterial composition or method of any one of embodiments 1, 2, 3, and 4, wherein a food packaging material comprises the carbon-based nanomaterial.

Embodiment 130. The carbon-based nanomaterial composition or method of any one of embodiments 1, 2, 3, and 4, wherein the carbon-based nanomaterial is used in desalination processes.

Embodiment 131. The carbon-based nanomaterial composition or method of any one of embodiments 1, 2, 3, and 4, wherein the carbon-based nanomaterial is used in the formation or in combination with gasoline.

Embodiment 132. The carbon-based nanomaterial composition or method of any one of embodiments 1, 2, 3, and 4, wherein a gasoline comprises the carbon-based nanomaterial.

Embodiment 133. The carbon-based nanomaterial composition or method of any one of embodiments 1, 2, 3, and 4, wherein the carbon-based nanomaterial is used in the formation or in combination with ethanol or ethanol based fuels.

Embodiment 134. The carbon-based nanomaterial composition or method of any one of embodiments 1, 2, 3, and 4, wherein an ethanol or ethanol based fuel comprises the carbon-based nanomaterial.

Embodiment 135. The carbon-based nanomaterial composition or method of any one of embodiments 1, 2, 3, and 4, wherein the carbon-based nanomaterial is used in the formation or in combination with cancer targeting materials, such as peptides, or other proteins.

Embodiment 136. The carbon-based nanomaterial composition or method of any one of embodiments 1, 2, 3, and 4, wherein a cancer targeting material, such as peptides, or other known proteins, comprises the carbon-based nanomaterial.

Embodiment 137. The carbon-based nanomaterial composition or method of any one of embodiments 1, 2, 3, and 4, wherein the carbon-based nanomaterial is used in the formation or in combination with medical drug delivery systems, in particular, nano-drug delivery systems.

Embodiment 138. The carbon-based nanomaterial composition or method of any one of embodiments 1, 2, 3, and 4, wherein a drug delivery system comprises the carbon-based nanomaterial.

Embodiment 139. The carbon-based nanomaterial composition or method of any one of embodiments 1, 2, 3, and 4, wherein the carbon-based nanomaterial is used in the formation of concrete.

Embodiment 140. The carbon-based nanomaterial composition or method of any one of embodiments 1, 2, 3, and 4, wherein a concrete mixture comprises the carbon-based nanomaterial.

Embodiment 141. The carbon-based nanomaterial composition or method of any one of embodiments 1, 2, 3, and 4, wherein the carbon-based nanomaterial is used in geothermal processes.

EXAMPLES

The concepts described herein will be further described in the following Examples, which do not limit the scope of the invention described in the claims.

Example 1

A sample carbon-based nanomaterial composition S1 was formed according to certain embodiments described herein. The sample carbon-based nanomaterial composition was formed from a gas mixture that was placed into a carbon capture unit as described herein and ignited to form the carbon-based nanomaterial composition. The composition of the gas mixture used to form sample carbon-based nanomaterial composition S1 is summarized in Table 1 below.

TABLE 1

Gas Mixture Composition

| Gas | Composition (moles) |
|---|---|
| Acetylene | 1.2 |
| Oxygen | 0.3 |
| Hydrogen | 0.6 |
| Methane | 1.2 |

Temperature and pressure conditions used for igniting the gas mixture to form the sample carbon-based nanomaterial composition S1 are summarized in Table 2 below.

TABLE 2

Forming Conditions

| Condition | Pre Combustion | Post Combustion |
|---|---|---|
| Temperature (° F.) | 87.8 | 93.9 |
| Pressure (psig) | 71 | 100+ |

Figure 3A:
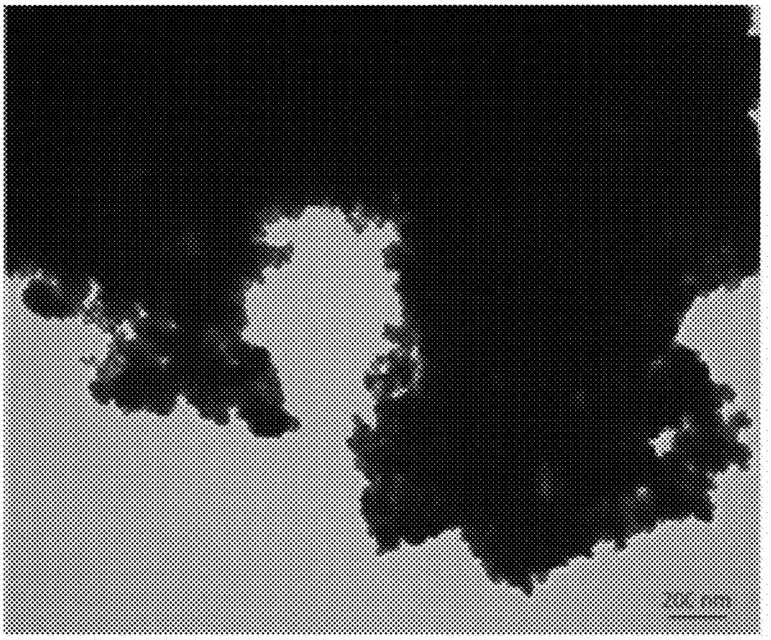
FIGS. 3*a* and 3*b* include transmission electron microscopy (TEM) images of sample carbon-based nanomaterial composition according to an embodiment of the present disclosure.
Figure 3B:
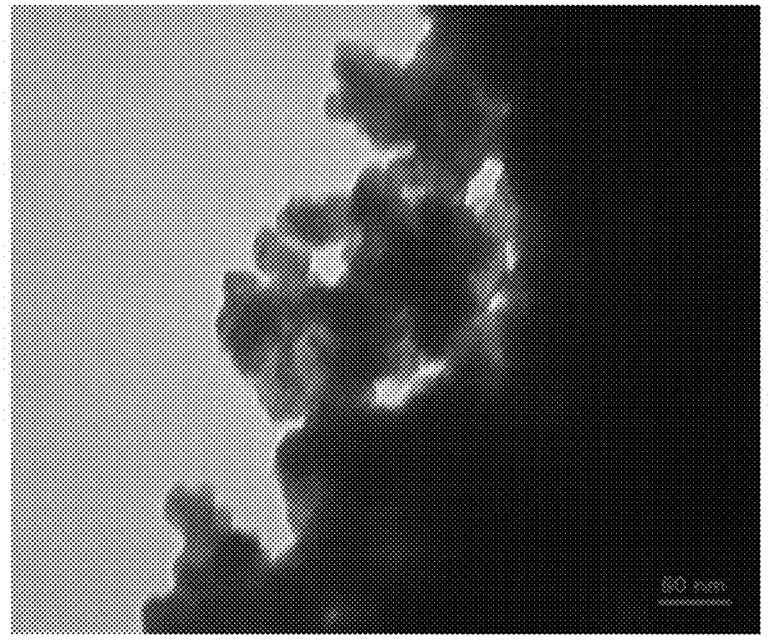
Figure 4:
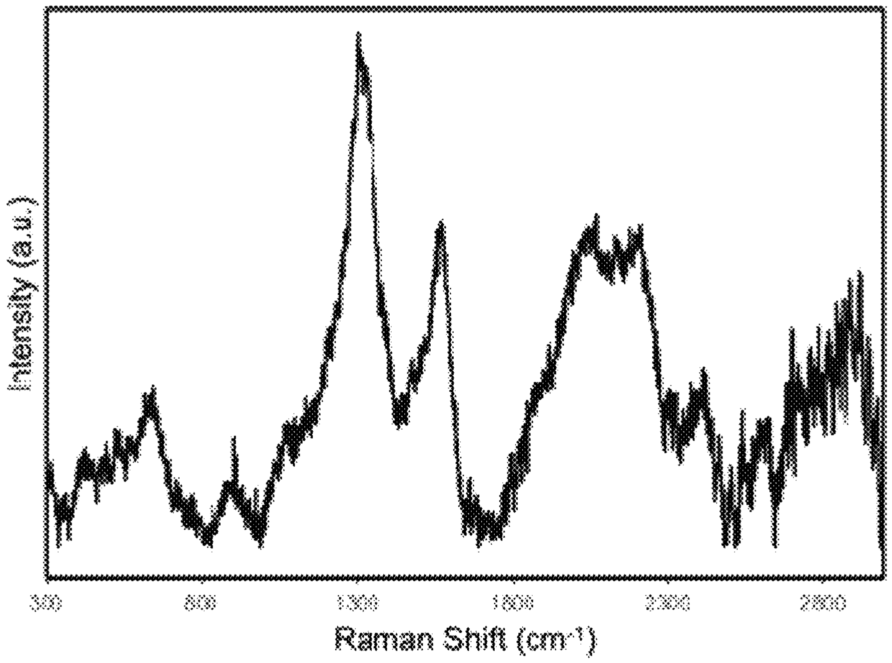
FIG. 4 shows a chart giving the Raman Spectra for sample carbon-based nanomaterial composition according to an embodiment of the present disclosure.

FIGS. 3*a* and 3*b* show transmission electron microscopy (TEM) images of sample carbon-based nanomaterial composition S1. FIG. 4 shows a chart giving the Raman Spectra for the sample carbon-based nanomaterial composition S1.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method of forming a carbon-based nanomaterial composition, wherein the method comprises:

supplying a gas mixture comprising:

acetylene gas at a molar ratio $AG_{mol}/GM_{mol}$ of at least about 0.25 and not greater than about 0.99, where the $AG_{mol}$ is equal to the moles of acetylene gas in the gas mixture and $GM_{mol}$ is equal to the total moles of gas in the gas mixture, oxygen gas at a molar ratio $OG_{mol}/GM_{mol}$ of at least about 0.01 and not greater than about 0.55, where the $OG_{mol}$ is equal to the moles of oxygen gas in the gas mixture and $GM_{mol}$ is equal to the total moles of gas in the gas mixture, hydrogen gas at a molar ratio $HG_{mol}/GM_{mol}$ of at least about 0.05 and not greater than about 0.75, where the $HG_{mol}$ is equal to the moles of hydrogen gas in the gas mixture and $GM_{mol}$ is equal to the total moles of gas in the gas mixture, and methane gas at a molar ratio $MG_{mol}/GM_{mol}$ of at least about 0.25 and not greater than about 0.99, where the $MG_{mol}$ is equal to the moles of methane gas in the gas mixture and $GM_{mol}$ is equal to the total moles of gas in the gas mixture, and igniting the gas mixture to form the carbon-based nanomaterial composition, wherein the carbon-based nanomaterial composition comprises carbon-based nanospheres, and wherein the carbon-based nanomaterial composition has a carbon hybridization ratio $P_{sp3}/P_{sp2}$ of at least about 0.1 and not greater than about 5.0, where $P_{sp3}$ is the percent of carbon within the carbon-based nanomaterial composition having a $sp^3$ hybridization and $P_{sp2}$ is the percent of carbon within the carbon-based nanomaterial composition having a $sp^2$ hybridization.

2. The method of claim 1, wherein the molar ratio $AG_{mol}/GM_{mol}$ of the acetylene gas is from at least about 0.30 to not greater than about 0.60.

3. The method of claim 1, wherein the molar ratio $OG_{mol}/GM_{mol}$ of the oxygen gas is from at least about 0.04 to not greater than about 0.15.

4. The method of claim 1, wherein the molar ratio $HG_{mol}/GM_{mol}$ of the hydrogen gas is from at least about 0.15 to not greater than about 0.40.

5. The method of claim 1, wherein the molar ratio $MG_{mol}/GM_{mol}$ of the methane gas is from at least about 0.25 to not greater than about 0.85.

6. The method of claim 1, wherein the molar ratio $MG_{mol}/GM_{mol}$ of the methane gas is from at least about 0.30 to not greater than about 0.60.

7. The method of claim 1, wherein the carbon hybridization ratio $P_{sp3}/P_{sp2}$ is from at least about 0.3 to not greater than about 3.0.

8. The method of claim 1, wherein the carbon-based nanomaterial composition has:

a carbon content of at least about 90 atom %; and an oxygen content of at least about 0.5 atom % to not greater than about 8 atom %.

9. The method of claim 8, wherein the oxygen content is from at least about 0.5 atom % to not greater than about 6 atom %.

10. The method of claim 1, wherein the carbon-based nanomaterial composition has a carbon content of at least about 93 atom % to not greater than about 99.5 atom %.

11. The method of claim 1, wherein the carbon-based nanomaterial composition has a D/G ratio of at least about 0.1 to not greater than about 2.0.

12. A method of forming a carbon-based nanomaterial composition, wherein the method comprises:

supplying a gas mixture comprising:

acetylene gas at a molar ratio $AG_{mol}/GM_{mol}$ of at least about 0.27 and not greater than about 0.80, where the $AG_{mol}$ is equal to the moles of acetylene gas in the gas mixture and $GM_{mol}$ is equal to the total moles of gas in the gas mixture, oxygen gas at a molar ratio $OG_{mol}/GM_{mol}$ of at least about 0.02 and not greater than about 0.50, where the $OG_{mol}$ is equal to the moles of oxygen gas in the gas mixture and $GM_{mol}$ is equal to the total moles of gas in the gas mixture, hydrogen gas at a molar ratio $HG_{mol}/GM_{mol}$ of at least about 0.10 and not greater than about 0.50, where the $HG_{mol}$ is equal to the moles of hydrogen gas in the gas mixture and $GM_{mol}$ is equal to the total moles of gas in the gas mixture, and methane gas at a molar ratio $MG_{mol}/GM_{mol}$ of at least about 0.25 and not greater than about 0.70, where the $MG_{mol}$ is equal to the moles of methane gas in the gas mixture and $GM_{mol}$ is equal to the total moles of gas in the gas mixture, and igniting the gas mixture to form the carbon-based nanomaterial composition, wherein the carbon-based nanomaterial composition has a carbon hybridization ratio $P_{sp3}/P_{sp2}$ of at least about 0.1 and not greater than about 5.0, where $P_{sp3}$ is the percent of carbon within the carbon-based nanomaterial composition having a $sp^3$ hybridization and $P_{sp2}$ is the percent of carbon within the carbon-based nanomaterial composition having a $sp^2$ hybridization.

13. The method of claim 12, wherein the carbon-based nanomaterial composition has:

a carbon content of at least about 90 atom %; and an oxygen content of at least about 0.5 atom % to not greater than about 8 atom %.

14. The method of claim 13, wherein the oxygen content is from at least about 0.5 atom % to not greater than about 6 atom %.

15. The method of claim 12, wherein the carbon-based nanomaterial composition has a carbon content of at least about 93 atom % to not greater than about 99.5 atom %.

16. The method of claim 12, wherein the carbon-based nanomaterial composition has a D/G ratio of at least about 0.1 to not greater than about 2.0.

17. The method of claim 12, wherein:

the molar ratio $AG_{mol}/GM_{mol}$ of the acetylene gas is from at least about 0.30 to not greater than about 0.60;

the molar ratio $OG_{mol}/GM_{mol}$ of the oxygen gas is from at least about 0.04 to not greater than about 0.15;

the molar ratio $HG_{mol}/GM_{mol}$ of the hydrogen gas is from at least about 0.15 to not greater than about 0.40;

the molar ratio $MG_{mol}/GM_{mol}$ of the methane gas is from at least about 0.25 to not greater than about 0.60; or any combination thereof.

18. The method of claim 17, wherein the molar ratio $MG_{mol}/GM_{mol}$ of the methane gas is from at least about 0.30 to not greater than about 0.60.

19. The method of claim 18, wherein the carbon hybridization ratio $P_{sp3}/P_{sp2}$ is from at least about 0.3 to not greater than about 3.0.

20. The method of claim 12, wherein:

the molar ratio $AG_{mol}/GM_{mol}$ of the acetylene gas is from at least about 0.30 to not greater than about 0.60;

the molar ratio $OG_{mol}/GM_{mol}$ of the oxygen gas is from at least about 0.04 to not greater than about 0.15;

the molar ratio $HG_{mol}/GM_{mol}$ of the hydrogen gas is from at least about 0.15 to not greater than about 0.40; and the molar ratio $MG_{mol}/GM_{mol}$ of the methane gas is from at least about 0.25 to not greater than about 0.60.

21. The method of claim 20, wherein the molar ratio $MG_{mol}/GM_{mol}$ of the methane gas is from at least about 0.30 to not greater than about 0.60.

22. The method of claim 20, wherein the carbon hybridization ratio $P_{sp3}/P_{sp2}$ is from at least about 0.3 to not greater than about 3.0.

* * * * *